(12) United States Patent
Hager et al.

(10) Patent No.: US 7,929,775 B2
(45) Date of Patent: Apr. 19, 2011

(54) SYSTEM AND METHOD FOR RECOGNITION IN 2D IMAGES USING 3D CLASS MODELS

(75) Inventors: Gregory D. Hager, Baltimore, MD (US); Eliot Leonard Wegbreit, Palo Alto, CA (US)

(73) Assignee: Strider Labs, Inc., Palo Alto, CA (US)

( * ) Notice: Subject to any disclaimer, the term of this patent is extended or adjusted under 35 U.S.C. 154(b) by 1327 days.

(21) Appl. No.: 11/452,815

(22) Filed: Jun. 13, 2006

(65) Prior Publication Data

US 2006/0285755 A1 Dec. 21, 2006

Related U.S. Application Data

(60) Provisional application No. 60/691,732, filed on Jun. 16, 2005.

(51) Int. Cl.
*G06K 9/62* (2006.01)
*G06K 9/00* (2006.01)
(52) U.S. Cl. ......... 382/224; 382/154
(58) Field of Classification Search .......... 382/154, 382/181, 209, 218, 224; 345/419
See application file for complete search history.

(56) References Cited

U.S. PATENT DOCUMENTS

| | | | |
|---|---|---|---|
| 5,325,472 A | 6/1994 | Horiuchi et al. | |
| 5,666,441 A | 9/1997 | Rao et al. | |
| 5,710,875 A | 1/1998 | Harashima et al. | |
| 6,047,078 A | 4/2000 | Kang | |
| 6,278,798 B1 * | 8/2001 | Rao | 382/154 |
| 6,532,301 B1 | 3/2003 | Krumm et al. | |
| 6,611,630 B1 | 8/2003 | Miller et al. | |
| 6,687,416 B2 | 2/2004 | Wang | |
| 6,711,293 B1 | 3/2004 | Lowe | |
| 6,807,304 B2 | 10/2004 | Loce et al. | |
| 6,845,178 B1 | 1/2005 | Evans et al. | |
| 6,865,289 B1 | 3/2005 | Berestov | |
| 6,888,955 B2 | 5/2005 | Masumoto et al. | |
| 6,956,569 B1 * | 10/2005 | Roy et al. | 345/426 |
| 7,103,212 B2 | 9/2006 | Hager et al. | |
| 7,397,473 B2 * | 7/2008 | Chakraborty | 345/419 |
| 7,397,970 B2 * | 7/2008 | Han et al. | 382/281 |
| 7,551,755 B1 * | 6/2009 | Steinberg et al. | 382/118 |
| 7,646,909 B2 * | 1/2010 | Jiang et al. | 382/154 |
| 2002/0051578 A1 | 5/2002 | Imagawa et al. | |

(Continued)

OTHER PUBLICATIONS

Kevin W. Bowyer et al., "A Survey of Approaches to Three-Dimensional Face Recognition", Proceedings of the 17th International Conference on Pattern Recognition 2004.

(Continued)

*Primary Examiner* — Daniel G Mariam
(74) *Attorney, Agent, or Firm* — Gard & Kaslow LLP

(57) ABSTRACT

A system and method for recognizing instances of classes in a 2D image using 3D class models and for recognizing instances of objects in a 2D image using 3D class models. The invention provides a system and method for constructing a database of 3D class models comprising a collection of class parts, where each class part includes part appearance and part geometry. The invention also provides a system and method for matching portions of a 2D image to a 3D class model. The method comprises identifying image features in the 2D image; computing an aligning transformation between the class model and the image; and comparing, under the aligning transformation, class parts of the class model with the image features. The comparison uses both the part appearance and the part geometry.

35 Claims, 5 Drawing Sheets

U.S. PATENT DOCUMENTS

| | | | |
|---|---|---|---|
| 2002/0090132 | A1 | 7/2002 | Boncyk et al. |
| 2002/0110262 | A1 | 8/2002 | Iida et al. |
| 2003/0007680 | A1 | 1/2003 | Iijima et al. |
| 2003/0091226 | A1 | 5/2003 | Cahill et al. |
| 2003/0161534 | A1 | 8/2003 | Loce et al. |
| 2003/0169906 | A1 | 9/2003 | Gokturk et al. |
| 2004/0001059 | A1 | 1/2004 | Pfister et al. |
| 2004/0046864 | A1 | 3/2004 | Gross et al. |
| 2004/0175039 | A1 | 9/2004 | Miller |
| 2004/0190766 | A1 | 9/2004 | Watanabe et al. |
| 2004/0252889 | A1 | 12/2004 | Liu et al. |
| 2004/0258309 | A1 | 12/2004 | Keaton et al. |
| 2005/0063582 | A1 | 3/2005 | Park et al. |
| 2005/0084149 | A1 | 4/2005 | Aizawa et al. |
| 2005/0084151 | A1 | 4/2005 | Aggarwal et al. |
| 2006/0039600 | A1* | 2/2006 | Solem et al. .................. 382/154 |
| 2008/0297502 | A1* | 12/2008 | Simard et al. ................. 345/420 |

OTHER PUBLICATIONS

Sylvain Petitjean, "A Survey of Methods for Recovering Quadrics in Triangle Meshes", ACM Computing Surveys, Jun. 2002, vol. 34, No. 2, pp. 211-262.

Krystian Mikolajczyk et al., "A Performance Evaluation of Local Descriptors", IEEE Transactions on Pattern Analysis and Machine Intelligence, Oct. 2005, vol. 27, No. 10, pp. 1615-1630.

"Segmentation of Range Images as the Search for Geometric Parametric Models", International Journal of Computer Vision, Apr. 1995, vol. 14. No. 3, pp. 253-277.

K. Mikolajczyk et al., "A Comparison of Affine Region Detectors", International Journal of Computer Vision, Nov. 2005, vol. 65, No. 1-2, pp. 43-72.

Scott Helmer et al., "Object Class Recognition with Many Local Features", Proceedings of the 2004 IEEE Computer Society Conference on Computer Vision and Pattern Recognition Workshops, 2004.

R. Fergus et al., "Object Class Recognition by Unsupervised Scale-Invariant Learning", Proceedings. 2003 IEEE Computer Society Conference on Computer Vision and Pattern Recognition, Jun. 18-20, 2003, vol. 2, pp. 264-271.

Michael C. Burl et al., "A Probabilistic Approach to Object Recognition Using Local Photometry and Global Geometry", Computer Vision-ECCV, 1998, vol. 1407.

Ralph Gross et al., "Growing Gaussian Mixture Models for Pose Invariant Face Recognition", Pattern Recognition, 2000, Proceedings, 15th International Conference on, Sep. 3-7, 2000, vol. 1, pp. 1088-1091.

William Eric Leifur Grimson, "Object Recognition by Computer, The Role of Geometric Constraints", The MIT Press Classics Series, Jan. 1991.

Andrew E. Johnson et al., "Using Spin Images for Efficient Object Recognition in Cluttered 3D Scenes", IEEE Transaction on Pattern Analysis and Machine Intelligence, May 1999, vol. 21, No. 5, pp. 433-449.

Andrea Frome et al., "Recognizing Objects in Range Data Using Regional Point Descriptors", ECCV 2004, LNCS 3023, pp. 224-237, 2004, Springer-Verlag Berlin Heidelberg 2004.

Matthew Turk et al., "Eigenfaces for Recognition", Journal of Congitive Neuroscience, vol. 3, 1991, Massachusetts Institute fo Technology.

Peter N. Belhumeur et al., "Eigenfaces vs. Fisherfaces: Recognition Using Class Specific Linear Projection", IEEE Transactions on Pattern Analysis and Machine Intelligence, Jul. 1997, vol. 19, No. 7, pp. 711-720.

Cordelia Schmid et al., "Local Grayvalue Invariants for Image Retrieval", IEEE Transactions on Pattern Analysis and Machine Intelligence, May 1997, vol. 19, No. 5, pp. 530-535.

David G. Lowe, "Object Recognition from Local Scale-Invariant Features", Proc. of the International Conference on Computer Vision, Corfu, Sep. 1999.

David G. Lowe, "Distinctive Image Features from Scale-Invariant Keypoints", International Journal of Computer Vision, Jan. 5, 2004.

Gyuri Dorko et al., "Object Class Recognition Using Discriminative Local Features" Draft, IEEE Transactions on Pattern Analysis and Machine Intelligence, Oct. 25, 2004.

Gy. Dorko et al., "Selection of Scale-Invariant Parts for Object Class Recognition", Proceedings. Ninth IEEE International Conference on Computer Vision, 2003, Oct. 13-16, 2003, vol. 1, pp. 634-639.

Hiroshi Murase et al., "Visual Learning and Recognition of 3-D Objects from Appearance", International Journal of Computer Vision, 14, May 24, 1995, Kluwer Academic Publishers.

Pope et al., "Probabilistic Models of Appearance for 3-D Object Recognition," International Journal of Computer Vision, 2000, pp. 149-167, 40(2), Kluwer Academic Publishers, The Netherlands.

Ponce et al., "Toward True 3D Object Recognition," Congrès de Reconnaissance des Formes et Intelligence Artificielle, Jan. 2004, Toulouse, France.

Medioni et al., "3-D Structures for Generic Object Recognition," Proceedings of the IAPR International Conference on Pattern Recognition, Sep. 2000, pp. 30-37, vol. 1, Barcelona, Spain.

Arbel et al., "Recognizing Objects from Appearance Flows," located at http://homepages.inf.ed.ac.uk/rbf/CVonline/LOCAL_COPIES/ARBEL/appearance-flows.html on May 5, 2005.

Ghita et al., "Object Recognition Using Eigenvectors," Proceedings of the SPIE—The International Society for Optical Engineering, vol. 3208—Intelligent Robots and Computer Vision XVI: Algorithms, Techniques, Active Vision, Materials Handling, 1997, Pittsburgh, PA, pp. 85-91.

Johnson et al. "Recognizing Objects by Matching Oriented Points," Submitted to IEEE Computer Vision and Pattern Recognition, CVPR '97, 1997.

Svetlana Lazebnik, et al., "A Sparse Texture Representation Using Local Affine Regions," IEEE Transactions on Pattern Analysis and Machine Intelligence, vol. 27, No. 8, Aug. 2005, pp. 1265-1278, IEEE Computer Society.

Chien-Ping Lu, et al., "Fast and Globally Convergent Pose Estimation from Video Images," IEEE Transactions on Pattern Analysis and Machine Intelligence, vol. 22, No. 6, Jun. 2000, pp. 610-622, IEEE.

Gregory D. Hager, "A Modular System for Robust Positioning Using Feedback from Stereo Vision," IEEE Transactions on Robotics and Automation, vol. 13, No. 4, Aug. 1997, pp. 582-595, IEEE.

Seth Hutchinson, et al., "A Tutorial on Visual Servo Control," IEEE Transactins on Robotics and Automation, vol. 12, No. 5. Oct. 1996, IEEE.

* cited by examiner

SYSTEM AND METHOD FOR RECOGNITION IN 2D IMAGES USING 3D CLASS MODELS

CROSS-REFERENCE TO RELATED APPLICATIONS

This application claims the benefit of U.S. Provisional Patent Application Ser. No. 60/691,732, filed Jun. 16, 2005, entitled "System and Method for Object Recognition Using 3D Range and Intensity Models," which is incorporated herein by reference in its entirety.

BACKGROUND OF THE INVENTION

1. Field of the Invention

The present invention relates generally to the field of computer vision and, in particular, to recognizing instances of visual classes.

2. Description of the Prior Art

Class recognition is concerned with recognizing class instances in a scene. As used in this context, "class" is a collection of objects that share common visual characteristics and differ from objects in other classes by visual characteristics.

The first step in class recognition is to build a database of known classes. The second step in class recognition is to match new instances observed in images with their classes represented in the database.

Class recognition presents many problems. First, it presents the problems of recognizing a specific object. An object may appear very differently when viewed from a different perspective, in a different context, or under different lighting conditions. In addition to the problems of object recognition, class recognition presents additional problems related to within-class variation. The instances of a class may vary in certain aspects of their shape or their visual appearance. A class recognizer must be able to deal with this additional variability and detect class membership based on the common characteristics of the class.

Previously, there has been no entirely satisfactory solution to these problems. Substantial research has been devoted to class recognition, but there are none that can recognize instances of a wide variety classes from a wide variety of viewpoints and distances.

Prior Academic Research

Substantial research has been devoted to the simpler problem of object recognition, but there are no object recognition systems that can recognize a wide variety of objects from a wide variety of viewpoints and distances. Class recognition is a significantly more difficult problem, of which object recognition is a subset. An object recognition system need only identify the specific objects for which it has been designed. In contrast, a class recognition system must be able to identify previously unseen objects as class instances on the basis of similarity to the common characteristics of a class.

One line of research in class recognition represents a class as an unordered set of parts. Each part is represented by a model for the local appearance of that part, generalized over all instances of the class. The spatial relationship of the parts is ignored; only appearance information is used. One paper taking this approach is Dorko and Schmid, "Selection of Scale-Invariant Parts for Object Class Recognition", *International Conference on Computer Vision*, 2003, pp. 634-640. A later paper by the same authors, expanding on this approach, is "Object Class Recognition Using Discriminative Local Features," *IEEE Transactions on Pattern Analysis and Machine Intelligence*, also available as *Technical Report RR-5497, INRIA-Rhone-Alpes-February* 2005. There are several difficulties with this general approach. The most important is that, since the geometric relationship of the parts is not represented, considerable important information is lost. A collection of parts jumbled into random locations can be confused with an object in which these parts are in appropriate locations.

Another line of research in class recognition represents a class as a constellation of parts with 2D structure. Two papers applying this approach are Burl et al., "A probabilistic approach to object recognition using local photometry and global geometry", *Proc. European Conference on Computer Vision (ECCV)* 1998, pp 628-641, and Fergus et al., "Object Class Recognition by Unsupervised Scale-Invariant Learning", *Computer Vision and Pattern Recognition*, 2003, pp 264-271. Another paper along these lines is Helmer and Lowe, "Object Class Recognition with Many Local Features", *IEEE Computer Vision and Pattern Recognition Workshops*, 2004 (CVPRW'04), pp. 187 ff. There are two difficulties with using two-dimensional models of this kind. First, the local appearance of parts is not invariant to changes in object pose relative to the camera. Second, the relationship of the parts is acquired and modeled only as the parts occur in 2D images; the underlying 3D spatial relationship is not observed, computed, nor modeled.

Other Prior Work

U.S. patent application Ser. No. 11/159,660, filed Jun. 22, 2005, by the present inventors, entitled "System and Method for 3D Object Recognition Using Range and Intensity," describes techniques for addressing these problems. It discloses a system and method for recognizing objects and instances of classes when the database of models and the scene are both acquired using combined range and image intensities. That is, both the models and the acquired images are three-dimensional.

Image acquisition using combined range and intensities requires special apparatus, e.g., a stereo system or a combined camera and laser range finder. In most cases, the database of class models can be built in this way, because database construction can be done under controlled conditions. However, there are many circumstances where range information cannot be obtained in the recognition step. That is, the intensity information can be readily obtained, e.g., with a simple camera, but it is difficult to acquire high-resolution range information for the scene.

Hence, there is a need for a system and method able to perform class recognition in 2D images that have only image intensity information using 3D models of geometry and appearance. Additionally, there is a need for an object recognition system and method that overcomes the limitations of prior techniques.

SUMMARY OF THE INVENTION

The present invention provides a system and method for recognizing instances of classes in a 2D image using 3D class models.

The present invention provides a system and method for constructing a database of 3D class models comprising a collection of class parts, where each class part includes part appearance and part geometry.

The present invention also provides a system and method for matching portions of a 2D image to a 3D class model. The method comprises identifying image features in the 2D image; computing an aligning transformation between the class model and the image; and comparing, under the aligning transformation, class parts of the class model with the image features. The comparison uses both the part appearance and the part geometry.

Various embodiments of the system and the method and several alternatives are also disclosed. A first embodiment performs class recognition. A second embodiment performs object recognition. Both the first and second embodiments make advantageous use of the properties of the 3D models and their use in the recognition techniques of the present invention The present invention also provides a computer-readable medium comprising program instructions for performing the steps of the method.

DETAILED DESCRIPTION OF THE INVENTION

The present invention performs class recognition by using models containing both three-dimensional range and intensity appearance information to recognize class instances in two-dimensional intensity images of observed scenes.

Additionally, the present invention performs object recognition by using models containing both three-dimensional range and intensity appearance information to recognize objects in two-dimensional intensity images of observed scenes.

Overview

Figure 1:
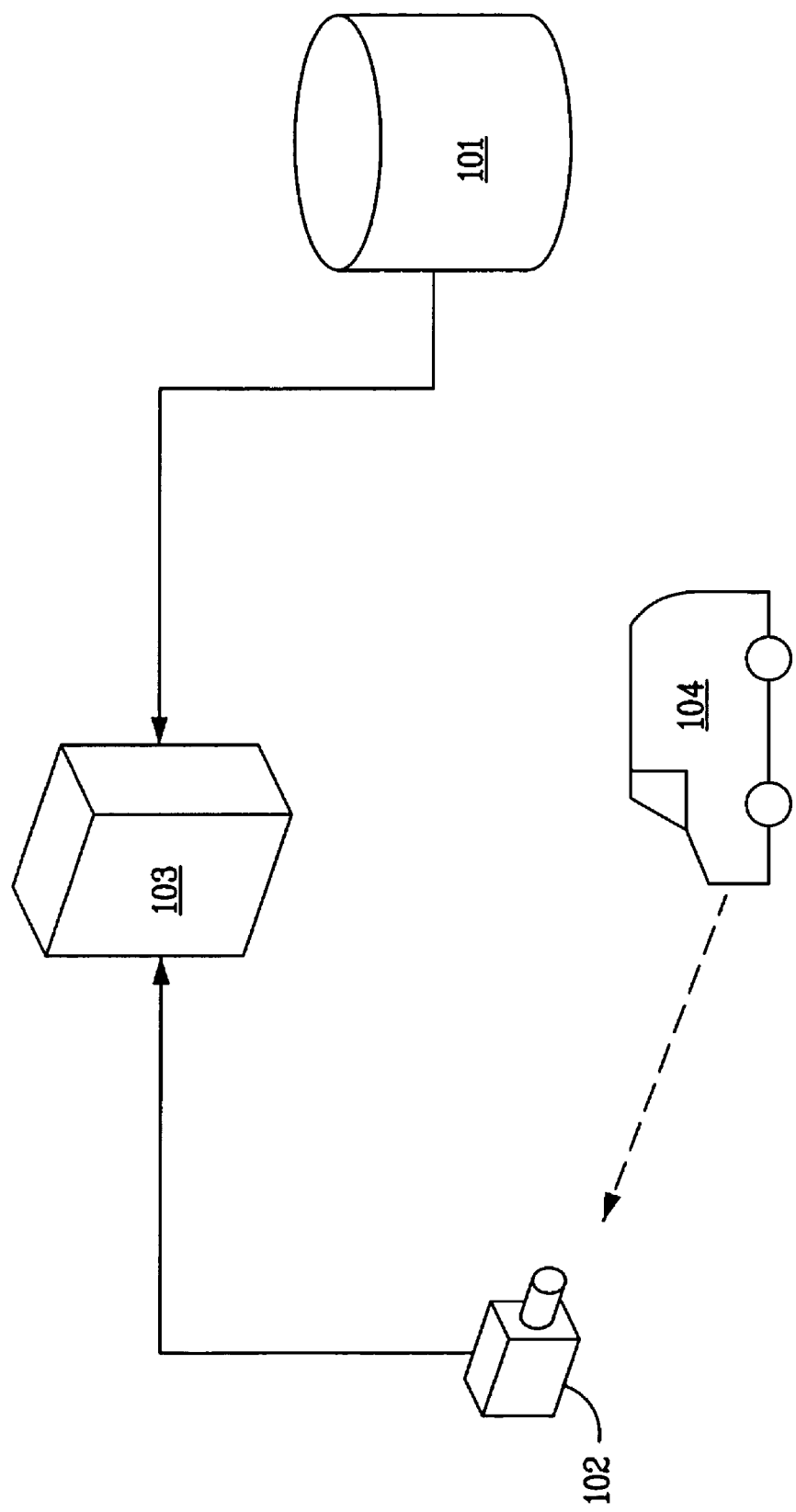
FIG. 1 is a symbolic diagram showing the principal components of a system for performing class recognition according to an embodiment of this invention.

FIG. 1 is a symbolic diagram showing the principal components of a system for performing class recognition according to an embodiment of this invention. A database 101 contains 3D class models. A camera 102 is provided for acquiring a 2D intensity image of a scene. Computer 103 is configured to match class instances appearing in the scene to the 3D class models.

As used herein, the term "scene" refers to some portion of the 3D world, while the term "2D image" or "image" refers to a 2D projection of one or more intensity values obtained by some imaging device. An imaging device that acquires a 2D intensity image is referred to as a "camera". Typically the intensity is light intensity, in which case the images are gray scale or color images, but this need not be the case. Intensity images can be formed with radar, ultrasound, or many other modalities. The present invention can be used with 2D images formed with various sources of intensity.

A "visual class" is a collection of objects that have similar appearance and/or geometry. A "3D class model" is a model of a visual class that includes a representation of the appearance and the 3D geometry of objects belonging to that class.

A database of 3D class models is constructed from so-called "3D images". A 3D image is constructed by obtaining a 2D intensity image and a corresponding three-dimensional description of a scene. The three-dimensional description is referred to as a "range image". This range image is placed into correspondence with the intensity image to produce a registered range and intensity image. This is referred to as a "3D image". In a 3D image, each image location has one or more intensity values, and a corresponding 3D coordinate giving its location in space.

3D images are used by the present invention to advantageously construct class models that are used to recognize class instances in 2D intensity images. To understand this, consider how changes in object pose affect the appearance of local features in a 2D image of an object. There are six possible changes to the pose of an object:

Two of these are translational motions parallel to the imaging plane of the camera;

One is a rotation about the optical axis of the camera;

One is a change in the distance between the camera and the object;

Two are changes in the slant and tilt of the object relative to the camera.

Changes in the position of the object parallel to the imaging plane of the camera only cause changes in the position of a feature in an image and therefore do not affect its appearance if a correction is made for the location of the feature in the image plane. Rotation of the object about the optical axis of the camera leads to rotation and translation of the feature in the image. There are many methods for locating and representing features that account for these changes.

The present invention addresses the difficulties presented by the remaining three changes: in distance, slant, and tilt. It does so by using the registered range and intensity information to create 3D class models that (1) account for the effect of pose variation on the representation of feature appearance and (2) can be aligned to 2D image features during recognition.

The overall process of class recognition has two phases: (1) 3D database construction and (2) recognition in a 2D image using the database.

Figure 2:
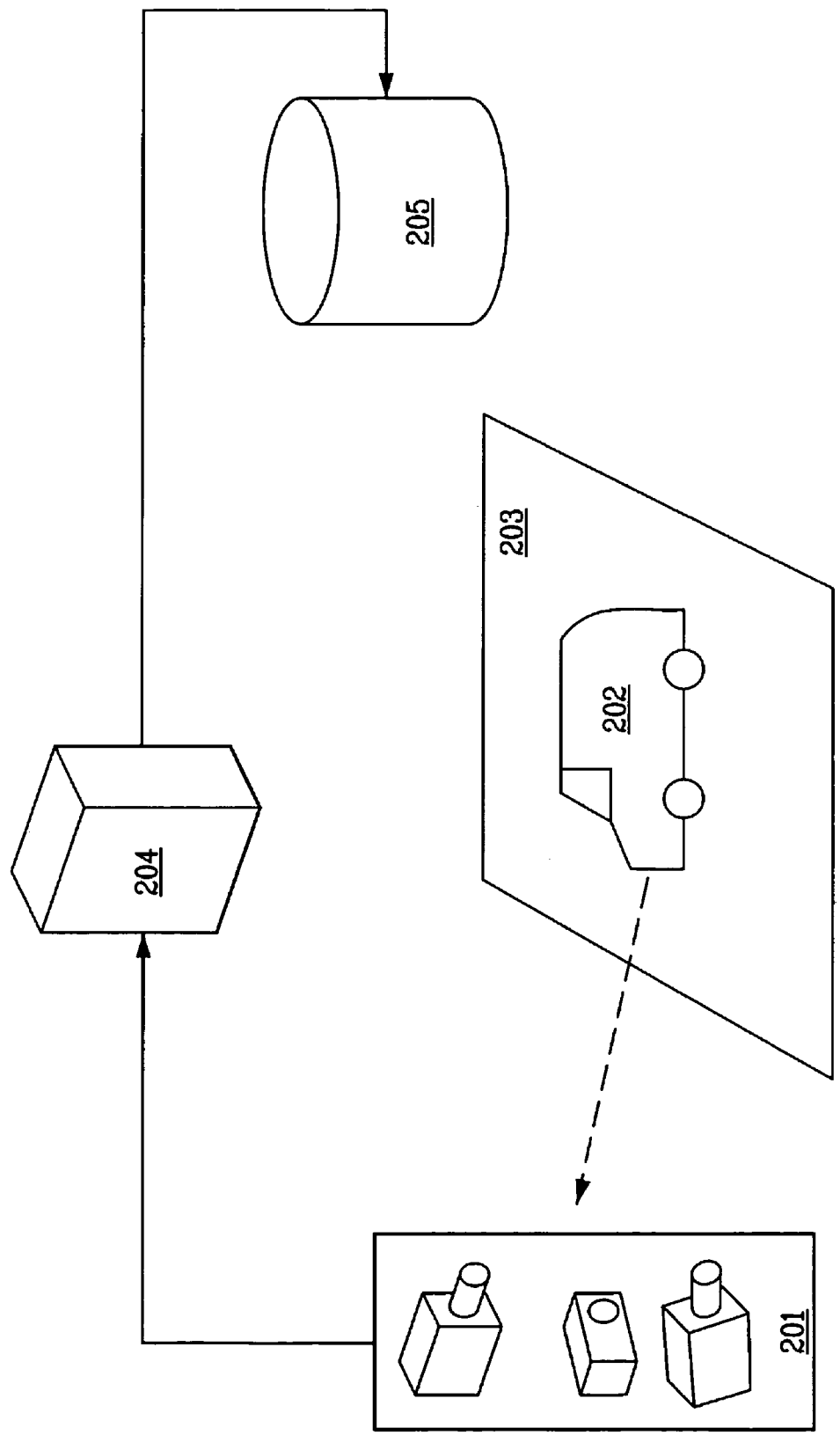
FIG. 2 is a symbolic diagram showing the principal components of a system for constructing a class database according to an embodiment of this invention.

FIG. 2 is a symbolic diagram showing the principal components of a system for constructing a class database according to an embodiment of this invention. A 3D imaging system 201 acquires 3D images of objects 202 on a horizontal planar surface 203 at a known height. A computer 204 uses the images to build 3D class models and stores the class models in a database 205. The database can be constructed under controlled conditions. In particular, registered range and intensity information is used to build 3D models.

During recognition, 2D intensity images are acquired under uncontrolled conditions and there is no associated 3D range information. A scene may contain none, one, or more than one instance of a known class. If an instance of a class is present, it may be present once or more than once. An instance may be partially occluded and may be in contact with other objects in the scene. The goal of class recognition is to locate objects in a 2D image of the scene that match 3D class models in the database.

As described below, the present invention uses the 3D class models of the database to recognize class instances in the 2D intensity image, by advantageously using properties of the 3D class models and the necessary relationships between a 3D surface and its projection onto a 2D image.

There are various embodiments of the present invention. It is convenient to describe the present invention in the following order: First, principles of the invention, then first and second embodiments, and then various alternative embodiments. Choice among the various embodiments is based partially on the application and, in particular, the classes to be recognized.

PRINCIPLES OF THE PRESENT INVENTION

Detecting Interest Points

The present invention makes use of image interest points. Image interest points are distinctive locations in an image. Their detection is a starting point for class recognition. Methods for detecting interest points are referred to as "interest point operators", "interest point detectors", or "affine region detectors". Several such methods are described in K. Mikolajczyk et al., "A Comparison of Affine Region Detectors" *International Journal of Computer Vision*, Volume 65, Number 1-2, November 2005, pp. 43-72.

The interest points are detected at a scale that can be expressed in terms of the extent, in pixels, of the associated local region of the image. Differences in scale arise due to changes in the distance to the surface being imaged, or due to changes in the physical dimensions of the pattern on the surface, or both. Various interest point operators may be used in various embodiments of the present invention so long as a chosen operator satisfies the following requirements: (1) The location it computes is relatively insensitive to change of viewing direction, rotation about the optical axis and scale; (2) it computes, about the interest point, a local region whose extent is relatively insensitive to change of viewing direction, rotation about the optical axis and scale; (3) it computes two orthogonal axes specifying orientation about the optical axis that are relatively insensitive to change of viewing direction and scale. Several interest point operators satisfy these requirements as described in the publication by Mikolajczyk et al., id.

Representing Interest Points

Let P be a local region in an image detected by an interest point operator. A description of the local appearance, A, is computed as a function of the intensity image on the local region. Such descriptions are variously referred to in the art as "appearance descriptors", "local features" or "local descriptors". Several such descriptors are described in K. Mikolajczyk et al, "A Performance Evaluation of Local Descriptors", *IEEE Transactions on Pattern Analysis and Machine Intelligence*, Volume 27, Issue 10, October 2005, pp. 1615-1630. Various appearance descriptors may be used in various embodiments of the present invention.

When referring to an image, it is convenient to refer to the 2D location of an interest point as a "feature location", to refer to a description of local appearance at an interest point as a "feature appearance", and to refer to the combination as an "image feature".

During the construction of the class database, there is range data associated with the local region P. With this range data, it is possible to compute the 3D location of the interest point and the surface normal of the interest point. Furthermore, it is possible to resample the intensity image on the local region so that it appears as if it had been acquired from a chosen viewing direction. The scale at which the feature is detected further allows the region to be sampled to a canonical scale, again expressed as an extent, in pixels, that the region occupies. When a feature is resampled at canonical scale, its region in pixels is the same regardless of the viewing distance. The result of resampling an image patch to a canonical viewing direction and scale is referred to as a "canonical appearance". This canonical appearance is invariant to the pose relative to a viewing camera and is said to be "pose invariant". The ability to construct pose invariant descriptions of appearance during class database construction is one of the advantages of the present invention.

In typical embodiments, the viewing direction is chosen to be frontal, i.e., along the normal direction. The canonical scale is chosen to of sufficient resolution to adequately represent the appearance of features. Methods for performing this resampling are described in U.S. patent application Ser. No. 11/159,660, filed Jun. 22, 2005, entitled "System and Method for 3D Object Recognition Using Range and Intensity", which is incorporated herein by reference in its entirely.

The dominant gradient direction in the image patch in its canonical appearance can be used to define an orientation for the patch about the surface normal. Together, the surface normal and orientation about the surface normal define the orientation of the interest point in 3D space. The 3D orientation taken together with the 3D location defines a "pose" for the interest point.

During database construction, appearance descriptors of the local region P are computed from the canonical appearance, thus removing the effects of slant, tilt, distance to the surface, and region size on local appearance. For each interest point, a descriptor is computed consisting of a 3D geometry descriptor, which specifies the pose, and one or more appearance descriptors.

During recognition, interest points are detected in an image using the same interest point operator as in database construction. However, only 2D intensity information is available, since there is no range data. A feature descriptor for an image consists of the 2D image location and one or more appearance descriptors computed from the intensity image.

Class Models

Statistical data models are used to represent 3D classes. A class model is computed from a set of objects that provide a representative sample of the instances of that class. As described in the present invention, it is possible to use statistical models to describe classes so that the 2D image of an object that is similar to those in the representative sample can be identified as being similar. The statistical model allows the database to generalize from the representative sample so that the recognition phase can identify previously unseen class instances in 2D images.

The objects providing a representative sample of a class are referred to as "sample objects". The sample objects share common visual characteristics; in particular, they have interest points with similar local appearance in similar locations. It is convenient to refer to interest points in the sample objects as "elements" and elements with similar local appearance in similar local locations as "corresponding elements". These corresponding elements characterize the common characteristics of a class. Each set of corresponding elements is represented in a class model by a "class part".

An element has geometry, referred to as the "element geometry," and appearance, referred to as the "element appearance." The geometry describes the location and related properties; the appearance describes the local visual characteristics. These are represented in class models by "part geometry" and "part appearance" using statistical data models.

The present invention standardizes the element geometry by scaling operations or other geometric normalizations. The result is that the elements have "canonical geometry". One specific technique for standardizing the element geometry is described the first embodiment and other techniques are described in the alternative embodiments. When a class model is built from sample objects with canonical geometry, the class part geometry represents the canonical geometry of corresponding elements.

The present invention also standardizes the element appearance by resampling to a canonical viewing direction and scale, resulting in a "canonical appearance". One specific technique for resampling is described the first embodiment and other techniques are described in the alternative embodiments. When a class model is built from sample objects with canonical appearance, the class part appearance represents the canonical appearance of corresponding elements. In particular, the part appearance of a class model has two appearance descriptors, one of which is pose invariant and is constructed using 3D information, and the other of which is computed from the 2D image without use of 3D information.

Statistical Modeling of Data

Given a set of data vectors $x_1, x_2, \ldots x_d$, an empirical distribution of the values of the data elements can be computed using a variety of methods. A common method is to compute the mean and covariance of the data vectors and to model the distribution as a multivariate Gaussian distribution. In the literature, a Gaussian distribution is often referred to as a "normal distribution".

It is convenient to use the following notational convention: If x is a random variable, the mean is denoted as $\mu_X$, the covariance is denoted as $\Lambda_X$ and the two together as X, so that $X=(\mu_X, \Lambda_X)$. Hence, X is the distribution of the random variable x.

Let n be the number of components of x. If y is a sample vector from Gaussian distribution X, the probability density value of y given this model is expressed by $$P(y|\mu_X, \Lambda_X) = \exp(-(y-\mu_X)^T \Lambda_X^{-1}(y-\mu_X)/2)((2\pi)^{n/2}|\Lambda_X|^{1/2})$$

Here $(y-\mu_X)^T$ denotes the matrix transpose of $(y-\mu_X)$ and $|\Lambda_X|^{1/2}$ denotes the square root of the determinate of $\Lambda_X$. It is convenient to denote the right hand side of the above equation using the more compact form $G(y; \mu_X, \Lambda_X)$. That is, $G(y; \mu_X, \Lambda_X)$ is defined as $$G(y; \mu_X, \Lambda_X) = \exp(-(y-\mu_X)^T \Lambda_X^{-1}(y-\mu_X)/2) / ((2\pi)^{n/2}|\Lambda_X|^{1/2}) \quad (1)$$

In some cases, there are insufficient values of sample data or the given values lie within a linear subspace. In these cases, it is not possible to compute an invertible (full-rank) covariance matrix $\Lambda_X$, and thus the above equation cannot be evaluated. In these cases, a dimensional reduction can be performed on the data. Methods for performing dimensional reduction and associated statistical modeling of this form are discussed in a variety of textbooks such as Duda, Hart, and Stork, *Pattern Classification*, John Wiley, 2001. Alternatively, as an approximation, the variance of each dimension can be computed independently, in which case $\Lambda_X$ is a diagonal matrix.

It is also possible that the data does not conform to the Gaussian model. For example, the data may in fact be taken from multiple Gaussian models. In the latter case, clustering can be performed on the data to identify the major modes in the distribution. One method of performing clustering is to choose a set of k cluster centers (e.g., by randomly choosing k data elements), and to associate each data element to the nearest cluster. Once this is done, the cluster centers can be recomputed as the average of the associated data elements and the process repeated. This procedure is referred to as k-means clustering. Once clusters are established by this method, Gaussian distributions for each cluster can be again computed as described above. The distribution for the entire dataset is a "mixture" of these Gaussian distributions. Suppose there are n clusters, each with an associated data model $(\mu_i, \Lambda_i)$. The mixture distribution is represented as $\theta = \{(\mu_i, \Lambda_i, m_i)\}$, $i=1 \ldots n$ where $m_i$ is the number of points associated with the ith cluster. The probability of y in the mixture of Gaussians is $$P(y|\theta) = \sum_i (m_i/M) G(y; \mu_i, \Lambda_i), \text{ where } M = \sum_i m_i$$

More generally, a mixture of Gaussians can be computed by so-called "expectation maximization". These and other related methods are described in standard textbooks such as Duda, Hart, and Stork, id.

In general, whatever the method of statistical modeling, a set of model parameters $\theta$ can be computed to characterize the statistical distribution of the data, and the likelihood of an observed data element y is written $P(y|\theta)$.

Estimation and Projection of 3D Geometry Under an Aligning Transformation

Class recognition computes an alignment of a 3D class model with detected features in a 2D image and evaluates the likelihood of detected feature locations given an aligned model.

In regard to alignment, suppose three or more 3D model locations and corresponding 2D image locations are given. An "aligning transformation," $\gamma$, that relates the 3D model to the 2D image locations can be computed. One technique for doing so is the algorithm described in C-P. Lu, G. Hager and E. Mjolsness, "Fast and Globally Convergence Pose Estimation from Video Images", *IEEE Trans. on Pattern Analysis and Machine Intelligence*, June 2000, pp. 610-622. The aligning transformation $\gamma$ has the form (t, r), where t is a 3D translation vector and $\Gamma$ is a 3D rotation matrix. This aligning transformation is computed by minimizing a match error between the locations of 3D model points and the observed locations of the matching image features as they would project to the model under the aligning transformation. Other techniques for computing an aligning transformation may alternatively be used.

An aligning transformation and a pose both specify a translation and a rotation; they have the same information. The term "aligning transformation" is used herein when the information relates a 3D class model to a 2D image. The term "pose" is used to refer to the geometry specification of a 3D class part; it is also used when describing an identified class instance.

There are two operations used in class recognition that involve the statistical properties of an estimated aligning transformation. They are:

(1) Computing the relative certainty on the alignment $\gamma$. This is expressed by the covariance matrix $\Lambda_\Gamma$.

(2) Projecting additional model locations into the image, taking into account the statistical distribution of model locations and uncertainty in the model alignment. Each projected location is represented by an estimate v and a covariance $\Lambda_V$.

Both operations can be understood by first considering properties of the camera projection $\pi$ of a 3D location x under an aligning transformation $\gamma$ to a 2D image location v. Let $\gamma=(t, r)$. The 3D location x is mapped into the 3D position $\gamma$ by the aligning transformation $$y = T(\gamma, x) = t + r \, x$$

That y position is projected into the 2D location v by the camera projection $\rho$ $$v = \rho(y) = \lambda^* (y_1/y_3, y_1/y_3)$$

where the scaling factor $\lambda$ is a constant related to the camera in question. Putting these together, the projection of x under the aligning transformation $\gamma$ can be written compactly as $v = \pi(\gamma, x) = \rho(T(\gamma, x))$.

Suppose that $\gamma$ and x are multivariate Gaussian random variables with statistics $\Gamma = (\mu_\Gamma, \Lambda_\Gamma)$ and $X = (\mu_X, \Lambda_X)$. To first order, the mean of the projected 2D location is $\mu v = \pi(\mu_\Gamma, \mu_X)$.

Two well-known properties of Gaussian distributions are used below. First, the covariance of the sum of two independent normally distributed random variables is the sum of the covariance of each variable. Second, suppose that p is normally distributed with covariance $\Lambda_P$, and that q is defined by the linear equation $q = A\, p$, where A is a matrix. Then q is normally distributed and its covariance $\Lambda_Q$ is given by $$\Lambda_Q = A \, \Lambda_P \, A^T \quad (2)$$

To compute the covariance $\Lambda_V$ of the projected 2D location, it is convenient to consider a linearized version of the projection $\pi$. Let $J_\Gamma = J_\gamma(\mu_\Gamma, \mu_X)$ be the Jacobian matrix of $\pi$ with respect to $\gamma$ and let $J_X = J_X(\mu_\Gamma, \mu_X)$ be the Jacobian matrix of $\pi$ with respect to x, both evaluated at $\mu_\Gamma$ and $\mu_X$. Jacobian matrices are discussed in standard texts such as Kaplan, *Advanced Calculus*, Addison-Wesley, 1993. Jacobians applied to the problem of camera projection can be found in S. Hutchinson, G. Hager and P. Corke, "A Tutorial Introduction to Visual Servo Control," *IEEE Trans. on Robotics and Automation*, 12(5) pp. 651-670, 1996, and also G. Hager, "A Modular System for Robust Hand-Eye Coordination Using Feedback from Stereo Vision." *IEEE Trans. on Robotics and Automation*, 13(4) pp. 582-595, 1997.

Using the chain rule, these Jacobian matrices follow directly from the Jacobians for T and $\rho$. The matrix of partial derivatives of T with respect to $\gamma$ is a 3 by 6 Jacobian which is given in block form as $$J_T(\gamma, x) = [I_3 - r^* sk(x)]$$

where $I_3$ is the 3 by 3 identity matrix, and $sk(x)$ is the skew symmetric matrix defined as $$sk(y) = \begin{bmatrix} 0 & -y_3 & y_2 \\ y_3 & 0 & -y_1 \\ -y_2 & y_1 & 0 \end{bmatrix}$$

By direct differentiation, $J_\rho(y)$ is the 2 by 3 matrix $$J_\rho(y) = \begin{bmatrix} y_3 & 0 & -y_1 \\ 0 & y_3 & -y_2 \end{bmatrix} * (\lambda/y_3^2);$$

It follows that $$J_X = J_x(\mu_\Gamma, \mu_X) = J_\rho(T(\mu_\Gamma, \mu_X))^* r$$

and $$J_\Gamma = J_\gamma(\mu_\Gamma, \mu_X) = J_\rho(T(\mu_\Gamma, \mu_X))^* J_T(\mu_\Gamma, \mu_X) \quad (3)$$

To first order, the change in the projected image location $\Lambda_V$ is given by $$\Delta v = J_\Gamma \, \Delta_\gamma + J_X \Delta X$$

Applying Equation (2) and assuming that x and $\gamma$ are independent random variables, it follows that the 2D location covariance is given by $$\Lambda_V = J_\Gamma \Lambda_\Gamma (J_\Gamma)^T + J_X \Lambda_X (J_X)^T \quad (4)$$

Note that the location covariance $\Lambda_\Gamma$ has dimensions 6 by 6, $\Lambda_X$ has dimensions 3 by 3, and $\Lambda_V$ has dimensions 2 by 2.

Thus, given a normal distribution X on the 3D location of a class part and a normal distribution on an aligning transformation $\Gamma$, it is possible to compute a statistical representation of the distribution $V = (\mu_V, \Lambda_V)$ of 2D image locations to which the 3D location projects under the aligning transformation.

The covariance $\Lambda_\Gamma$ of the aligning transformation $\Gamma$ is computed as follows. Suppose there are n pairs of 3D locations, $x_i$, and corresponding 2D image feature locations, $v_i$, where n is at least 3. To first order, the change in the ith image location is given by $$\Delta v_i = J_{\Gamma i} \Delta \gamma + J_{Xi} \Delta x_i$$

where $J_{\Gamma i}$ is the Jacobian $J_\Gamma$ evaluated at $x_i$ and $J_{Xi}$ is the Jacobian $J_X$ evaluated at $x_i$. There are n such equations.

This set of equations can be written more compactly by stacking the matrices $J_{\Gamma i}$ to create a new matrix $J_\Gamma$, creating a block diagonal matrix $J_X$ from the matrices $J_{Xi}$, and stacking the values of $v_i$ and $x_i$ to create vectors v and x, respectively. The covariance matrices for the latter are $\Lambda_v$ and $\Lambda_X$, which are block diagonal matrices constructed from the corresponding component covariance matrices.

The resulting equation is $$\Delta v = J_\Gamma \Delta \gamma + J_x \Delta x$$

Hence, $$J_\Gamma \Delta \gamma = \Delta v - J_x \Delta x$$

Let $M = (J_\Gamma^T J_\Gamma)^{-1} J_\Gamma$-hu T. The equation above can be solved for $\Delta \gamma$ $$\Delta \gamma = M(\Lambda_v - J_x \Delta x)$$

Applying Equation (2), it follows that the covariance of the aligning transformation is given by $$\Lambda_\Gamma = M(\Lambda_V + J_X \Lambda_X J_X^T) M^T \quad (5)$$

The term $\Lambda_V$ can be obtained in several ways. It can be determined empirically, or it calculated from the characteristics of the sensor. Alternatively, when it is small compared to the 3D location covariance $\Lambda_X$, it can be approximated as zero.

In summary, given a set of corresponding 3D locations and 2D image locations, it is possible to estimate an aligning transformation $\mu_\Gamma$ and its covariance $\Lambda_\Gamma$, and to use these values to compute the distribution on the projected 2D image feature locations of 3D locations under the estimated aligning transformation.

For later developments, the following notation is useful. Let u be an observed 2D image feature location and X be distribution on a corresponding 3D class model location. Let $\pi$ be the camera projection equation with the aligning transformation $\Gamma$. Let $v_\pi = v_\pi(X, \Gamma)$ be the mean value of the location to which X is projected and let $\Lambda_\pi = \Lambda_\pi(X, \Gamma)$ be the covariance, as computed by Equation (4). The probability of u, given X and the aligning transformation $\Gamma$ is $$P(u|X, \Gamma) = G(u; v_\pi, \Lambda_\pi)$$

Suppose f is an image feature at location u and c is a class part with location distribution X. It is convenient to describe the above probability as the "geometry likelihood" of the image feature f given the class part c and aligning transformation Γ. This is written as $$M_X(f, c, \Gamma) = P(u|X, \Gamma) = G(u; v_\pi, \Lambda_\pi) \quad (6)$$

This computation is an instance of comparing, under an aligning transformation, the class part c with image feature f. In this case, the comparison is a geometry comparison based on location and the comparison is carried out by projecting the class part location onto the image. As described below, there are other ways of comparing, under an aligning transformation, a class part c with image feature f. Also, as described below, other embodiments may take into account the dependence introduced when evaluating the likelihood of feature-part matches used to compute the aligning transformation.

Projection of Appearance Under an Aligning Transformation

As described above, the appearance of a local surface patch can be resampled so that the appearance is as if observed in a canonical 3D pose and at a canonical scale. Suppose that a 2D interest point is matched under an aligning transformation γ to a 3D class part having pose φ. The pose of the class part relates three-dimensional points in the local coordinate system of the class part to the coordinate system of the class model. The aligning transformation relates three-dimensional points in the coordinate system of the class model to the coordinate system of the observed camera image. Thus, their composition takes points in the local frame of the class part to camera image coordinates.

Thus, it is possible to resample the local image patch about the image interest point as if it had been observed in a canonical pose (correcting for location, orientation and scale). This resampled image patch is fully aligned with the appearance element of the 3D class part. This entire process is referred to as the "alignment of the image patch under the transformation γ to a class part with pose φ". It is described in detail below.

Consider a class part with appearance distribution $A=(\mu_A, \Lambda_A)$, and pose distribution $\Phi=(\mu_\Phi, \mu_\Phi)$. Let p denote the image patch about a 2D interest point. Let $\Gamma=(\mu_\Gamma, \Lambda_\Gamma)$ be a distribution on aligning transformations between the class model and the image.

In order to resample a 2D image patch to align it with a 3D class part, a grid of 3D points in class part coordinates is specified. These points are then transformed into image coordinates using the aligning transformation γ and the pose φ of the class part. The transformed points are then projected into the image using the equation for perspective projection to compute two-dimensional image locations. The intensity values at the projected two-dimensional image locations are then sampled to compute the appearance of p under the alignment γ to a class part with pose φ.

Let $y_1, y_2, \ldots, y_L$ be 3D locations of the class part c corresponding to locations for which appearance information is stored. Let $y_0$ be the location of the center of the part, which is also the part location in the class coordinate system. Let $T(\phi, y_i)$ denote the transformation of $y_i$ by the class part pose φ.

Let p(v) denote the intensity value of the image patch p at location v. The coordinate system for the patch is chosen so that the interest point of the patch is (0, 0). A simple resampling of the intensity value at $y_i$ would be $q(y_i) = p(\pi(\gamma, T(\phi, y_i)))$.

The invention makes use of the fact that, when matched, the center of the class part, $y_0$, should map to the 2D location of the interest point. In order to accommodate this, the projection of the center $v_0 = \pi(\gamma, T(\phi, y_0))$ is computed and a centering correction is made. With this, the resampling equation is $$q(y_i) = p(\pi(\gamma, T(\phi, y_i))) - v_0 \quad (7)$$

Repeating this operation for all locations $y_i$ produces a resampled image patch q that is the alignment of the image patch p under the aligning transformation γ to the class part with pose φ.

The first and second embodiments take the 3D grid of points to be planar, in which case the resampling process is known as "image rectification" or "resampling under a homography" and is covered in standard textbooks on computer vision such as Trucco and Verri, *Introductory Techniques for 3-D Computer Vision*, Prentice Hall, 1998, Section 7.3.7. Alternative embodiments may model the local surface geometry as a quadric, a spline, or as an unconstrained set of 3D points.

Let $q = W(p, \gamma, \phi)$ represent the mapping specified by Equation (7) for all L values of y. Thus, W represents all resampling operations necessary to compute alignment of the image patch p under the transformation γ to the class part with pose φ.

From Equation (7), it is possible to compute the quantities $K_\Gamma$ (the Jacobian of W with respect to γ evaluated at $\mu_\Gamma$) and $K_\Phi$ (the Jacobian of W with respect to φ evaluated at $\mu_\Phi$). $K_\Gamma$ is computed one row at a time. The ith row is $K_{\Gamma,i}$ the partial derivative of W with respect to γ, evaluated at $y_i$. For a location $y_i$, equation (3) describes a 2 by 6 matrix $J_{\Gamma,i} = J_\Gamma(\mu_\Gamma, T(\phi, y_i))$ that is the Jacobian of π with respect to γ. Let $J_{\Gamma 0} = J_\Gamma(\mu_\Gamma, T(\phi, y_0))$ Let the 1 by 2 row vector $\nabla p(v)$ denote the spatial gradient of the image patch p at location v. Further let $\nabla p_i$ denote $\nabla p(v_i)$ where $v_i = (\pi(\mu_\Gamma, T(\phi, y_i)) - v_0$. Methods for computing spatial gradients of images are covered in standard textbooks on computer vision such the one by Trucco and Verri. By the chain rule applied to Equation (7), the ith row of $K_\Gamma$ is $$K_{\Gamma,i} = \nabla p_i (J_{\Gamma i} - J_{\Gamma 0}).$$

Computing this quantity for all values of i produces $K_\Gamma$, which has L rows and 6 columns.

To compute $K_\Phi$, note that φ is composed of a rotation r and translation t. The matrix of partial derivatives of T with respect to φ=(t, r) acting on $y_i$ is a 3 by 6 Jacobian which is given in block form as $K_i = [I_3 - r^* sk(y_i)]$ where $I_3$ is the 3 by 3 identity matrix and $sk(y_i)$ denotes the 3 by 3 skew symmetric matrix. Recall that $J_x$ is the Jacobian of π with respect to its second argument. This Jacobian is evaluated at $\mu_\Gamma$ and the location $T(\mu_\Phi, y_i)$. By the chain rule, the ith row of $K_\Phi$ is $$K_{\Phi,i} = \nabla p_i (J_x(\mu_\Gamma, T(\mu_\Phi, y_i)) * K_i - J_x(\mu_\Gamma, T(\mu_\Gamma, y_0)) * K_0)$$

Computing this quantity for all values of i produces $K_\Phi$, which has L rows and 6 columns.

With these quantities established, to first order, the mean and variance of the aligned class part appearance are given by $$\mu_Q = W(p, \mu_\Gamma, \mu_\Phi) \quad (8)$$

$$\Lambda_Q = K_\Phi \Lambda_\Phi K_\Phi^T + K_\Gamma \Lambda_\Gamma K_\Gamma^T \quad (9)$$

Given the image feature appearance $Q = (\mu_Q, \Lambda_Q)$, consider determining if $\mu_Q$ matches $\mu_A$. This test may be approximated by computing the difference $\mu_A - \mu_Q$ and modeling the result as a zero-mean random variable with variance $\Lambda_A + \Lambda_Q$. As a result, the probability may be written as $$P(p|A, Q) = G(\mu_A - \mu_Q; 0, \Lambda_A + \Lambda_Q)$$

with $\mu_Q$ and $\Lambda_Q$ computed as described above. Other approximate methods for computing this probability are given in the section on alternative embodiments.

Suppose f is an image feature with appearance p that after resampling is represented by the distribution Q. Suppose c is a class part with appearance distribution A. It is convenient to describe the above probability as the "appearance likelihood" of the image feature f given class part c and alignment $\Gamma$. This may be written as $$M_A(f, c, \Gamma) = P(p|A, Q) = G(\mu_A - \mu_Q; 0, \Lambda_A + \Lambda_Q) \quad (10)$$

This computation is an instance of comparing, under an aligning transformation, the class part c with image feature f. In this case, the comparison is an appearance comparison and the comparison is carried out by resampling the appearance of the image feature.

Various embodiments may choose other methods of approximating this probability or may compute the probability or quality of an appearance match under an aligning transformation using other statistical or nonstatistical methods.

In some embodiments, it may be advantageous to account for the fact that pixels at the center of an intensity patch exhibit less variability than pixels at the edges of a patch due to uncertainty in the patch pose or aligning transformation. This may be accounted for by sampling the patch at variable resolution, starting with high resolution at the center of the patch, and reducing the sampling resolution for locations near the boundary of the patch.

Recognition by Matching 2D Image Features to 3D Class Parts

The final step of recognizing class instances uses the above techniques for comparing class parts with image feature to make a recognition decision. Recognizing class instances is an underdefined problem. Visual classes may share visual characteristics that make some images inherently subject to ambiguous interpretation. Also, occlusion can render only a portion of an object visible in an image and that portion may be subject to ambiguous interpretation. In the case of ambiguity, a decision must be made as to whether it is better to make an identification (risking the error of an erroneous identification) or to not make an identification (risking the error of a missed identification). Various embodiments of the present invention employ particular choices as to how these decisions are made.

One way an embodiment employs a choice is via the function used to score the agreement of a class model with a set of image features to determine whether that set of features is an instance of the class. This function is referred to as a "class score". Let C be a class model. Let F be a collection of 2D features. The class score may be written as S(F, C). In various embodiments of the present invention, the class score is defined in different ways.

Some embodiments define the class score to be the "class likelihood ratio", defined below. This choice favors the identification of a feature set F as an instance of class C when (F, C) is supported by a high preponderance of evidence and where additionally no other class has a high preponderance of evidence. Alternative embodiments may define the class score to be some function of the likelihood of the individual matches between F and C. This choice favors the interpretation of a feature set F as a class C when (F, C) is supported by a high preponderance of evidence; it does not directly consider other classes. Other alternative embodiments may define the class score to be the number of correspondences between F and C. This choice favors the interpretation of a feature set as a class C when the count of supporting pieces of evidence is large. Other embodiments may use still other definitions of class score.

An instance of the class C is considered to be present in the image if the class score S(F, C) is greater than a threshold, $\tau_C$.

The threshold $\tau_C$ may be a function of various factors, such as the class or the number of matching features. It may be empirically determined. To determine it empirically, a set of test cases with known labels is obtained and a value of $\tau_C$ is chosen that maximizes recognition results under specified criteria. One specific technique for so doing is described the first embodiment. Other techniques are described in the alternative embodiments.

The various possible choices for the class score often produce the same result. However, there are situations in which the results differ. Various embodiments of the present invention may use different definitions of the class score, basing the choice in part on the intended application.

Let C be a class model. Let F be the collection of 2D features in the image. The "class likelihood ratio is" is defined as $$L(F, C) = P(F|C)/P(F|\sim C)$$

P(F|C) is the probability of the image features F given that some instance of the class C is present in the image. P(F|~C) is the probability of the image features F given that some instance of the class C is not present in the image. In the first embodiment described below, the class score is defined to be the class likelihood ratio.

The class likelihood ratio is computed given two parameters. The first parameter is a set of assumed associations or so-called "feature-part matches" between image features and class parts belonging to a common class model. The set of feature-part matches and the class model is referred to as the "correspondence hypothesis" and is denoted by h. The second parameter is the aligning transformation $\Gamma$ that puts the 3D class model into correspondence with an instance of the class in the image. As a function of these two additional parameters, the class likelihood ratio has the form L(F, C, $\Gamma$, h).

The class likelihood ratio is approximated using the appearance likelihood ratio $L_A$, the geometry likelihood ratio $L_X$, and the discount factor, $L_D$. These depend on correspondence hypothesis h and the aligning transformation $\Gamma$. The "appearance likelihood ratio" $L_A$ may be written as $$L_A(F, C, h, \Gamma) = P(F_A|C, h, \Gamma)/P(F_A|\sim C)$$

The "geometry likelihood ratio" may be written as $$L_X(F, C, h, \Gamma) = P(F_X|C, h, \Gamma)/P(F_X|\sim C)$$

The "discount factor" $L_D$, is used to weight the outcome based on the number of matches compared with the number of expected matches. In the first embodiment described below, the factor is set to 1. The use of discount factors other than 1 is described in the section on alternative embodiments.

In class recognition in a scene, the goal is to identify class instances, computing the pose of each in the 3D scene. The pose is given by the mean of the aligning transformation. Each computation requires choosing a pose with maximal likelihood, while summing probabilities over all possible correspondence hypotheses h. In practice, the goal is to produce a highly certain result, in which case a single correspondence hypothesis h will dominate all others. As a result, the sum over h can be approximated by the maximum. Hence, the class likelihood may be computed by the approximation $$L(F, C) = \max_h \max_\Gamma L_A(F, C, h, \Gamma) L_X(F, C, h, \Gamma) L_D(C, h, \Gamma).$$

If the result of this expression exceeds a threshold, an instance of the class C is deemed present.

Alternative embodiments may use class scores other than the class likelihood; however, the essential method remains the same. The method entails computing a class score, computed on the basis of a correspondence hypothesis and an aligning transformation. The method chooses correspondence hypotheses whose scores meet an acceptance criterion. The value of the correspondence hypothesis h that maximizes the class score specifies the feature-part matches. The value of the aligning transformation r that maximizes the class score specifies the position and orientation of the class instance in the scene.

Using a set of correspondences, the recognition method aligns a class model to the image data and uses pose invariant feature descriptors to evaluate the correspondence. Also, the recognition method uses the geometry of the alignment to evaluate the joint likelihood of appearance and geometry feature-part matches. Additionally, the recognition method uses the joint likelihood to evaluate additional feature-part matches. All of these are advantages of the present invention.

First Embodiment

The first embodiment is described as follows: (1) database construction; and (2) recognition in an image.

Database Construction in the First Embodiment

Figure 3:
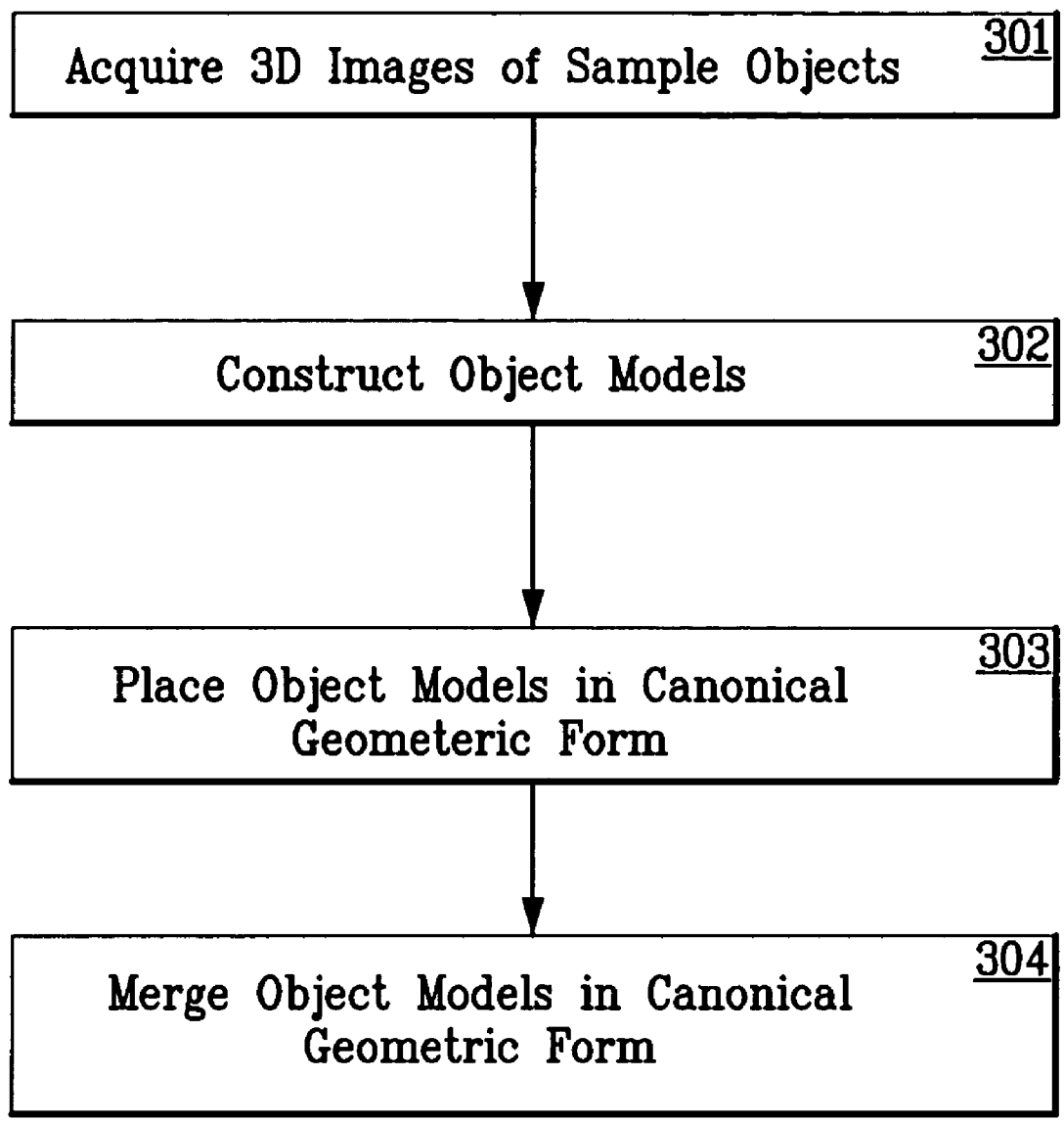
FIG. 3 is a flowchart showing the major steps of constructing a class model according to an embodiment of this invention.

A class database consists of a set of class models. FIG. 3 shows the major steps of constructing a class model. In Step 301, 3D images of sample objects belonging to the class are acquired. In Step 302, an object model is constructed for each sample object. In Step 303, the object models are placed in canonical geometric form. In Step 304, the object models in canonical geometric form are merged to form a class model.

Acquiring 3D Images

Several 3D images of a sample object, as viewed from multiple viewpoints, are obtained under controlled conditions. It is sometimes convenient to refer to these as "views" of an object. The scene contains a single foreground object on a horizontal planar surface at a known height. The background is a simple collection of planar surfaces of known pose with uniform color and texture. A stereo system acquires 3D images.

One embodiment of the stereo system uses a projector to cast a pattern of light onto the scene, a set of two or more cameras to acquire images, and a computer to compute the 3D position of points in the scene using stereo correspondence. This embodiment of the stereo system is disclosed in U.S. patent application Ser. No. 10/703,831, filed Nov. 7, 2003, which is incorporated herein by reference. Other embodiments are described in the Alternative Embodiments.

Constructing an Object Model

For each 3D image, interest points are located, and a descriptor is computed for each interest point. Interest points are located by computing the Harris-Laplace interest point detector as described in K. Mikolajczyk et al., "A Comparison of Affine Region Detectors," supra. Once detected, the dominant gradient orientation computed by the Harris-Laplace interest operator is used to determine rotation about the surface normal of the interest point. The surface normal at the interest point, together with the dominant gradient orientation, is used to compute a feature pose.

A first appearance descriptor is constructed by using the feature pose and the scale of the feature to resample the local appearance and thereby compute a canonical appearance descriptor. This is referred to as a "Type A" descriptor. Using 3D range information, this is computed to be invariant to scale, slant, tilt, and distance; that is, the Type A descriptor is pose invariant. Alternative embodiments may compute a pose invariant Type A feature descriptor in other ways.

In addition, a second appearance descriptor is constructed. It is based on the spin image technique introduced by A. Johnson and M. Hebert in "Using spin images for efficient object recognition in cluttered 3D scenes," *IEEE Trans. on Pattern Analysis and Machine Intelligence*, 21(5) pp. 433-449, 1999. This technique is modified to operate on intensity images as suggested in S. Lazebnik et al. "A Sparse Texture Representation Using Local Affine Regions," *IEEE Trans. on Pattern Analysis and Machine Intelligence*, 27(8) pp. 1265-1278, 2005. The resulting intensity-spin descriptor is referred to as a "Type B" descriptor. It is computed using only 2D intensity information and hence is not pose invariant. Other embodiments may use other appearance descriptors computed using only 2D intensity information.

In both the Type A and Type B appearance descriptors, photometric effects such as changes in brightness and contrast are removed by subtracting the mean of the intensity values and dividing by the standard deviation. These and other methods for reducing or removing the effect of photometric variation would be familiar to one of ordinary skill in the art.

In this way, each 3D image of an object has associated with it a set of object "elements", one element for each interest point. Each element has the form $<\phi, a, b>$, where $\phi$ is the 3D pose of the detected feature, the component a is its Type A appearance descriptor, and the component b is its Type B appearance descriptor. One of the innovations of the present invention is the construction and use of these two appearance descriptors. Their use in class construction and in recognition described below, where their utility will become clear.

The 3D images are taken under controlled conditions, so that each 3D image additionally has an associated view pose expressed relative to a fixed base coordinate system. Using the view pose, the elements are transformed to a common coordinate system. The set of elements in a common coordinate system form an object model.

Placing Object Models in Canonical Geometric Form

The next step is to place each object model in canonical geometric form. A resulting model is said to have "canonical geometry." The process is as follows:

1. The centroid of the set of 3D element locations of the object is computed. For object elements $f_1, f_2, \ldots f_n$, of the form $f_i=<x_i, a_i, b_i>$, and $x_i=<t_i, r_i>$ the centroid is the mean of the 3D locations $$\mu_O = (1/n)\sum_i t_i$$

2. The object scale is computed as $$\sigma_O = (1/n)\sum_i \|t_i - \mu_O\|$$

3. For each element $t_i=(x_i, y_i, z_i)^T$, a "canonical location" $t'_i$ is computed by subtracting the center and dividing by the object scale $$t'_i = (t_i - \mu_O)/\sigma_O$$

4. A new object element $f'_i$ is created $f'_i=<y_i, a_i, b_i>$ where $y_i=<t'_i, r_i>$.

The result of this process is an object model with elements $f'_1, f'_2, \ldots f'_n$. This embodiment standardizes the object geometry to be in a uniform location and scale, and preserves the appearance of object elements. Other embodiments could standardize in other ways, as described in the Alternative Embodiments. In some cases, the standardization may be interleaved with the next step described below. In general, the result is an object model with canonical geometry and is said to be a "canonical object model".

Constructing a Class Model from Canonical Object Models

The database is a set of 3D class models, one for each class. Each class model is constructed independently of the other class models. Each class model is a statistical description of the sample objects used to describe that class.

A class model is a collection of class parts. Each class part is a statistical model of corresponding elements in the sample objects. A class part has the form $<\Phi, A, B, \eta>$. The distribution $\Phi=(\mu_{101}, \Lambda_\Phi)$ is the mean and covariance of the 3D poses of corresponding elements, expressed in an object-centered geometric reference system. The distribution $A=(\mu_A, \Lambda_A)$ is the mean and covariance of the canonical appearances of the corresponding elements; this is the Type A appearance descriptor for the class part and is pose invariant. The distribution $B=(\mu_B, \Lambda_B)$ is the mean and covariance of the Type B appearances of the corresponding elements; this is the Type B appearance descriptor for the class part. The part appearance consists of the distributions A and B; each distribution is said to be one of the "components of the part appearance". The value $\eta$ is the fraction of elements that contributed to that class part from the total number of sample objects in the class.

A class model is created by first considering the 3D locations of the elements of all canonical object models belonging to a class. Object elements that are consistently detected will form clusters of 3D locations in the canonical models. The technique of k-means clustering is used to locate these location clusters. The value of k is determined empirically and interactively during the modeling process. Each location cluster identifies a set of corresponding elements and is used as the basis of a class part. For each location cluster, the mean and covariance is computed and stored as the "location component" of the part geometry. It is designated by $X=(\mu_X, \Lambda_X)$.

The part geometry also has a "rotation component". Suppose there are n elements in a particular location cluster, with rotations $r_1, \ldots, r_n$, each represented as a 3×3 rotation matrix. The mean rotation of a class part is computed as follows. First the sum is formed $r_{sum}=\Sigma_i r_i$. Next, the singular value decomposition of $r_{sum}$ is computed. This expresses $r_{sum}$ as $U S V^T$ where U and V are orthogonal matrices and S is a diagonal matrix. The mean rotation is computed as $$r_{mean}=U V^T$$

This form of a mean rotation is sometimes referred to in the literature as the "projected arithmetic mean". There are other techniques for computing mean rotation, as described in Moakher, "Means and Averaging in the Group of Rotations", *SIAM Journal on Matrix Analysis and Applications*, Vol. 24, Issue 1, pp 1-16, 2002 and such techniques may be used in alternative embodiments.

Consider the ith element of a cluster, with rotation $r_i$. Let $q_i$ be the rotation that expresses the deviation of $r_i$ from the mean. That is, $r_i=r_{mean}*q_i$. Hence, $q_i=r_{mean}^T r_i$.

To compute a statistical variance, each $q_i$ is expressed in a non-redundant form, as a 3-vector. The angle axis equivalent to $q_i$ is computed by converting to a quaternion and then to angles, as described in Eberly, *3D Game Engine Design*, Morgan Kaufmann, 2001. The result is a rotation axis, described by a unit vector k, and an angle $\theta$, representing a rotation about k. Multiplying k by $\theta$ to gives a non-redundant representation involving the three quantities $k_x\theta$, $k_y\theta$, and $k_z\theta$. Let $v_i$ be this 3-vector for the ith element. The covariance of the class part rotation is a matrix consisting of the covariance of the $v_i$s which is computed as $$\Lambda_R = (1/n)\sum_i v_i(v_i)^T$$

The mean rotation and the covariance together comprise the "rotation component" of the class part geometry.

Thus, a distribution on the pose of a class part is $\Phi=(\mu_\Phi, \Lambda_\Phi)$ where $\mu_\Phi=(\mu_X, r_{mean})$ and $\Lambda_\Phi$ is the block diagonal matrix composed from $\Lambda_X$ and $\Lambda_R$. This can also be written as $\Phi=<X, R>$ where X is a distribution on 3D location and R is a distribution on rotation.

Suppose a location cluster is computed above, clustering the object elements $\{e_1, \ldots e_n\}$. Each element has two appearance descriptors $a_i$ and $b_i$. These appearance descriptors are modeled using two means and two covariance matrices, one for the $a_i$ appearances of the elements and one for the $b_i$ appearances. Since an appearance descriptor is of high dimension, each of the two covariance matrices is approximated as the diagonal matrix containing the independent variances of each appearance descriptor data element.

Other embodiments may perform dimensional reduction on the appearance descriptors before computing the statistical model for appearance. Also, other embodiments may compute a mixture of Gaussians as a representation for the appearances. This may be useful in applications where, in some classes, there are two or more differently appearing class parts that occupy the same location in space over the set of objects within a class.

Finally, for each class part, the number of object elements that contribute to the part is tabulated and the ratio $\eta$ is computed. The resulting class part c is $$c=<\Phi, A, B, \eta>=<\mu_\Phi, \Lambda_\Phi, \mu_A, \Lambda_A, \mu_B, \Lambda_B, \eta>$$

The use of two different appearance descriptors is one of the advantages of the present invention. In recognition, the Type B appearance descriptor is used to locate probable correspondences between features in a 2D intensity image and 3D class parts. Using a set of these correspondences, the recognition method aligns a class model to the image. It then uses the pose invariant feature descriptor, of Type A, to provide a more accurate evaluation of the probability of the correspondence.

A 3D class model consists of a collection of class parts as described above. A class database consists of a set of 3D class models. Also, a database includes a set of thresholds used in recognition. These are:

(1) $\tau_{pair}$, a minimum threshold on the value of a score for retaining a feature-part match <f, c> when finding initial plausible feature-part matches.

(2) $\tau_{minH}$ and $\tau_{maxH}$, a minimum and maximum value for the number of feature-part matches in an initial correspondence hypothesis.

(3) $\tau_{init}(s)$, a minimum threshold on the score of a hypothesis for accepting an initial correspondence hypothesis for extension. It is a function of the length, s, of the initial correspondence hypothesis.

(4) $\tau_C$, a minimum threshold on the class likelihood ratio for deciding that an instance of a class has been identified in the scene.

These thresholds are computed when the 3D class database is constructed. However, it is convenient to first describe their use in recognition and subsequently explain how they are computed.

Additionally, alternative embodiments may also include various indices in the class database so that class parts having particular properties can be quickly located.

Recognition in the First Embodiment

Overview

Figure 4:
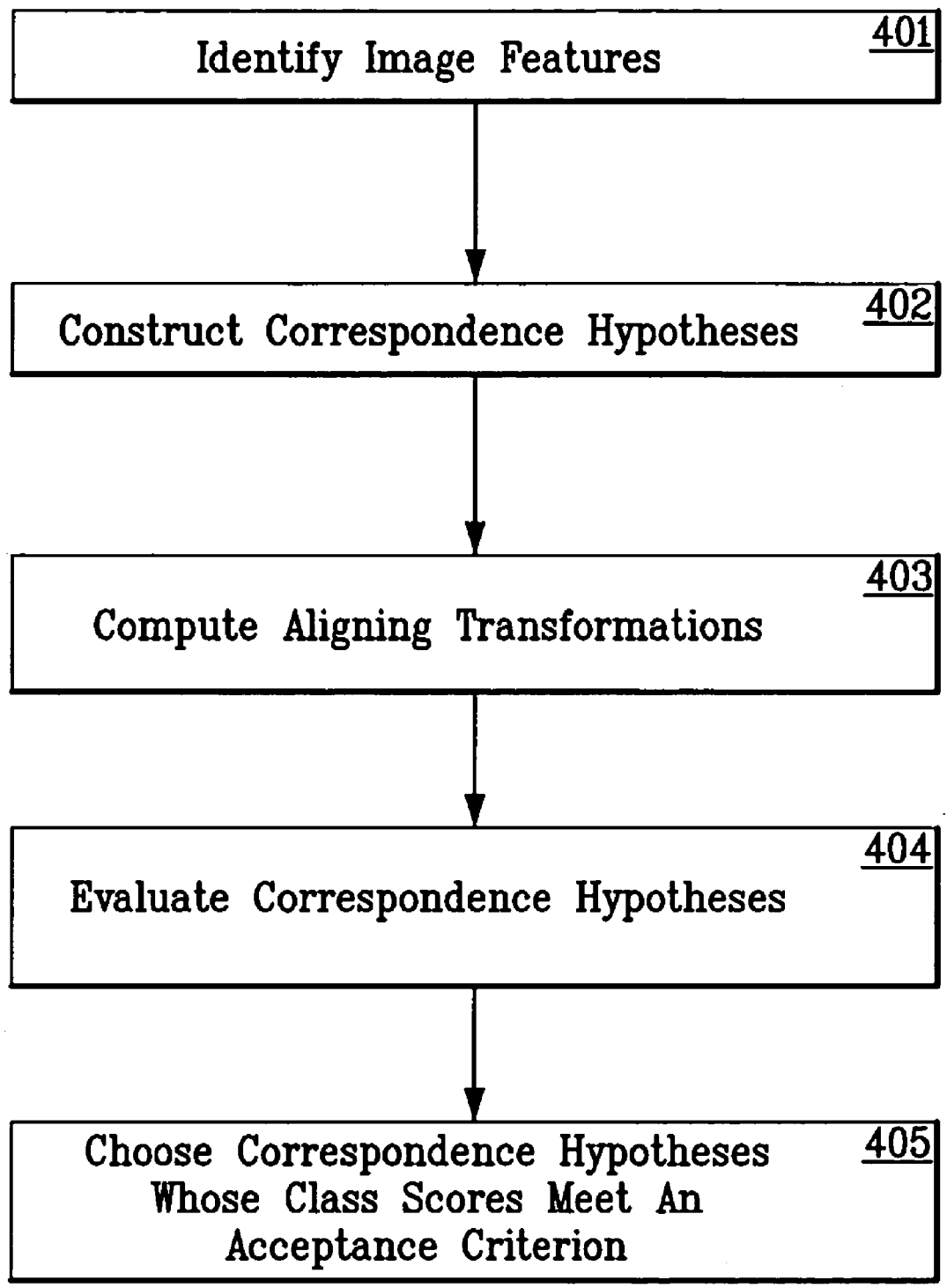
FIG. 4 is a flowchart showing the recognition process according to an embodiment of this invention.

Essentially, recognition of class instances is the search for good correspondence hypotheses. Intuitively, recognition entails finding a correspondence between a portion of an image and a class model. The recognition process mirrors this intuition, as shown in FIG. 4. In Step 401, image features are identified. In Step 402, correspondence hypotheses are constructed. In Step 403, aligning transformations are computed. In Step 404, correspondence hypothesis are evaluated. In Step 405, correspondence hypotheses whose class scores meet an acceptance criterion are chosen.

This process requires finding good correspondence hypotheses. Finding good correspondence hypotheses is a search problem. Because a correspondence hypothesis has multiple feature-part matches, the search problem is combinatoric. The problem can be visualized as a search tree. Search trees have been extensively studied. There are many techniques for searching, with many variations and refinements of each technique. Various embodiments of the present invention use various search techniques.

Figure 5:
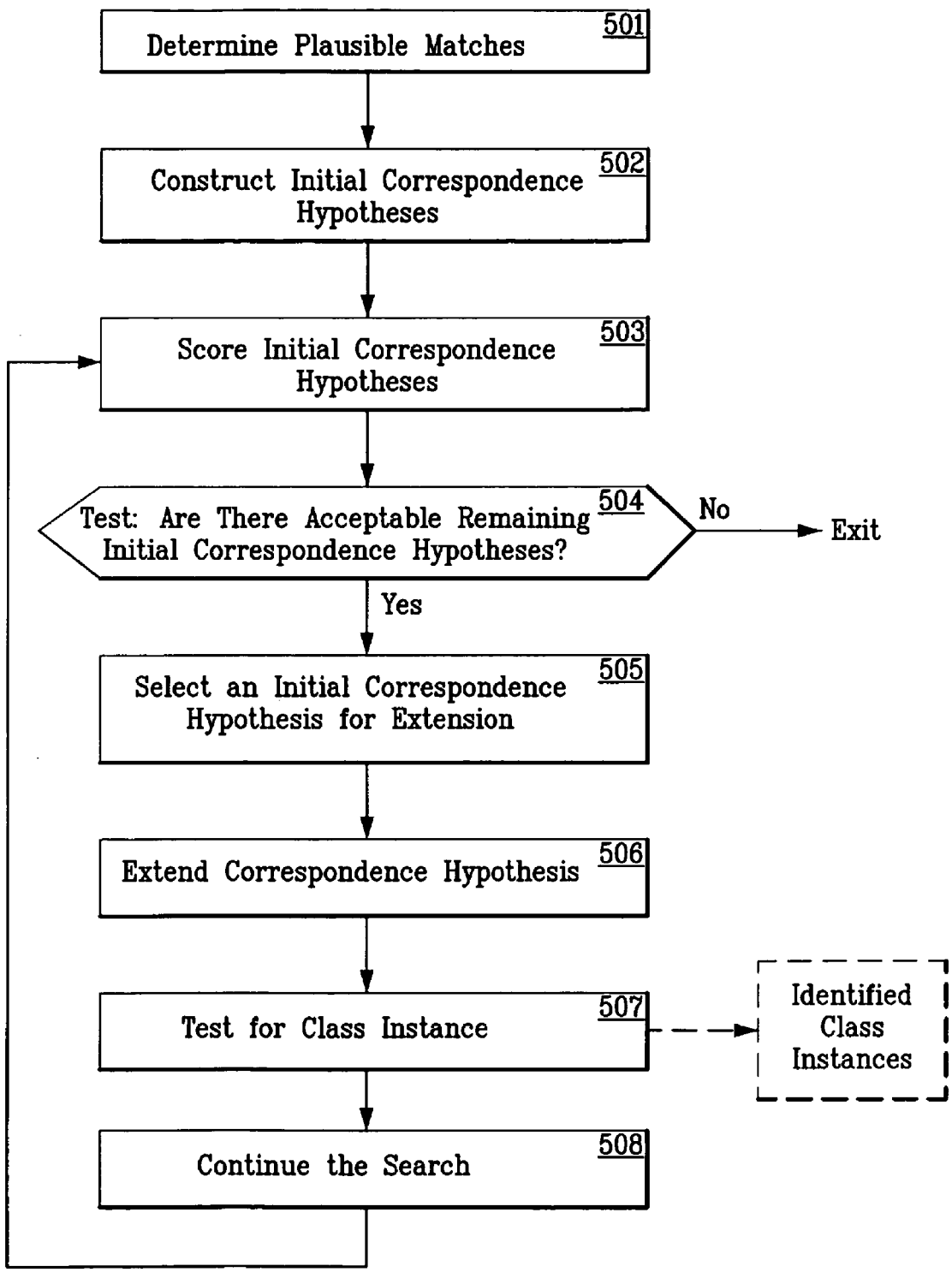
FIG. 5 is a flowchart showing the search technique performed during recognition according an embodiment of this invention.

The search technique used in the first embodiment is outlined in FIG. 5, which shows the major steps. In Step 501, plausible matches between image features and class parts are determined. In Step 502, multiple initial correspondence hypotheses are constructed. In Step 503, the initial correspondence hypotheses are scored by computing the class likelihood ratio under a correspondence hypothesis. In Step 504, a test is made as to whether one or more of the initial correspondence hypotheses are acceptable for further consideration; if not, the procedure exits. In Step 505, the best initial correspondence hypothesis is selected for extension. In Step 506, a correspondence hypothesis is extended with additional matches of image features with class parts, eventually resulting in a final correspondence hypothesis. In Step 507, the final correspondence hypothesis is used to test whether a class instance can be identified in the scene; if so, it is added to a set of identified class instances. In Step 508, the process returns to Step 503 to continue the search with another initial correspondence hypothesis.

Determining Plausible Matches of Image Features with Class Parts

A 2D image of the scene is acquired and is processed to identify interest points using the Harris-Laplace interest point detector. For each interest point, a feature descriptor $f=(u, p, b)$ is constructed. The value u is the 2D image location; p is the image patch surrounding the location u; and b is a Type B appearance descriptor computed using the spin image technique used to construct Type B part appearance descriptors of class parts. The same photometric normalizations as used in the class database construction are applied to the appearance descriptors. Note that Type A appearance descriptors cannot be computed, since 3D geometric information is not available from the 2D image.

For each image feature, plausible matches with class parts are determined by computing an appearance likelihood. Let $f=(u, p, b)$ be an image feature and let $c=(\Phi, A, B, \eta)$ be a class part. Using the Type B appearance descriptor b, the probability of the image feature f given the class part c is given by the appearance likelihood $M_B(f, c)$ $$M_B(f, c) = P(f|c) = G(b; \mu_B, \Lambda_B)$$

where $G(b; \mu_B, \Lambda_B)$ is defined by Equation (1). For each image feature f, the value of $M_B(f, c)$ is computed for all class parts, c, in the database. Those feature-part matches $<f, c>$ for which $$M_B(f, c) \geq \tau_{pair} \quad (11)$$

are retained. Let $M_{INIT}$ denote the set of all such pairs.

It is convenient to refer to the class C to which a class part c belongs as "c's class." It is also convenient to organize the set of pairs retained under the threshold test by class. For each class with some matching image feature, the set S(C) is constructed as $$S(C) = \{<f, c>\}, \text{ where c's class is C and } <f, c> \in M_{INIT} \quad (12)$$

As described later, alternative embodiments may avoid computing and testing $M_B(f, c)$ for all features f and class parts c. They do so by storing additional data structures containing information that supports efficient lookup and which restricts the set of possible class parts c to be considered for a given image feature f.

Constructing a Set of Initial Correspondence Hypotheses

The next step is to construct a set of initial correspondence hypotheses, $H_0$. In general, $H_0$ will contain multiple correspondence hypotheses. There are two reasons for the multiplicity. First, there may be multiple class instances in the scene; at least one correspondence hypothesis is required for each. Second, there may be multiple possible interpretations of portions of the image as class instances; each interpretation has a correspondence hypothesis.

The set of initial correspondence hypotheses $H_0$ is constructed by considering each class that has some matching image feature. Let C be such a class. Let $S(C) = \{<f, c>\}$ be computed as defined by Equation (12). The initial correspondence hypotheses associated with C are all sets of feature-part matches where each set has between $\tau_{minH}$ and $\tau_{maxH}$ components and where no two pairs have the same first component. Each such set is formed into an initial correspondence hypothesis. At least 3 components are required, so that an aligning transformation can be computed. The threshold $\tau_{minH} \geq 3$ is imposed to control the variance of the aligning transformation of the initial correspondence hypothesis. The threshold, $\tau_{maxH}$, is imposed so as to bound the number of such hypotheses. Hence, an initial hypothesis $h_0$ has the form $[<f_1, c_1>, <f_2, c_2>, <f_d, c_d>]$ where $d \in [\tau_{minH}, \tau_{maxH}]$ and $f_i = f_j$ only if $i = j$. The common class of the $c_i$s is referred to as the "class of the hypothesis." Alternative embodiments may choose the initial hypotheses in other ways.

Scoring the Initial Correspondence Hypotheses by Computing the Class Likelihood Ratio For each initial hypothesis $h_0$, an aligning transformation $\Gamma$, is computed between the image and the class model. Specifically, the method of Lu, Mjolsness and Hager, "Fast and Globally Convergence Pose Estimation from Video Images", supra, is applied to the set of 2D image locations u and set of 3D class part mean locations $\mu_x$ to produce a mean aligning transformation $\mu_\Gamma$. The covariance $\Lambda_\Gamma$ of the pose is computed as described in Equation (5). It is sometimes convenient to show the functional dependency of the aligning transformation on a hypothesis explicitly, as $\Gamma(h)$.

The fact that a distribution on the aligning transformation can be computed from an initial set of matches between a 3D class model and a set of image features and is one of the advantages of the present invention. The distribution, in turn, makes it possible to compute several important quantities as described below.

Let $<f, c>$ be a pair in the initial correspondence hypothesis $h_0$, where $f=(u, p, b)$ and $c=(\Phi, A, B, \eta)$. Let $\Gamma=(\mu_\Gamma, \Lambda_\Gamma)$ be the aligning transformation. Using Γ, a distribution, $Q=(\mu_Q, \Lambda_Q)$, is computed on the appearance of the image patch p after resampling. The mean is computed by resampling the patch to produce $\mu_Q=W(p, \mu_\Gamma, \mu_\Phi)$, as described in Equation (8). The covariance AQ is computed as described in Equation (9). It is sometimes convenient to display the functional dependency of $\mu_Q$, and $\Lambda_Q$ on F by writing $\mu_Q(\Gamma)$, and $\Lambda_Q(\Gamma)$.

The "aligned appearance likelihood" $M_A(f, c, \Gamma)$ is computed by Equation (10)

$$M_A(f, c, \Gamma)=P(Q|A)=G(\mu_A-\mu_Q(\Gamma); 0, \Lambda_A+\Lambda_Q(\Gamma))\qquad(10)$$

The aligned appearance likelihood projects the patch of the image feature f using the aligning transformation Γ. This takes into account the effect of tilt and slant on the appearance of the image feature. If a correspondence hypothesis h is correct, the aligning transformation Γ(h) is correct, and the projection provides an accurate correction for the associated appearance change. This is an example of an appearance comparison under an aligning transformation; other embodiments may make an appearance comparison under an aligning transformation in other ways. The fact that the appearance comparison under an aligning transformation can be computed from a correspondence hypothesis is one of the advantages of the present invention.

The geometry likelihood for each matched pair <f, c> in $h_0$ is also computed. Let f=(u, p, b). Let c=(Φ, A, B, η). Let Φ=<X, R> where X is the distribution on the 3D location. Let $\mu_\pi=\lambda_\pi(X, \Gamma)$ be the mean value of the projected location of X and let $\Lambda_\pi=\Lambda_\pi(X, \Gamma)$ be the covariance, as computed by Equation (4). Let $M_X(f, c, \Gamma)$ denote the geometry likelihood P(f|c, Γ), which is the probability density value of observing f at the location u given the projection of the location of class part c into the image under the estimated transformation Γ. $M_X(f, c, \Gamma)$ is computed by Equation (6)

$$M_X(f, c, \Gamma)=(u|X, \Gamma)=G(u; \mu_\pi, \Lambda_\pi)$$

The joint likelihood of the class part c=(Φ, A, B, η) matching feature f given the aligning transform Γ is $$M_J(f, c, \Gamma)=\eta*M_X(f, c, \Gamma)*M_A(f, c, \Gamma)$$

The joint appearance geometry likelihood ratio of the pair <f, c> is $$L(f, c, \Gamma)=M_J(f, c, \Gamma)/(r*\max_k M_B(f, k))$$

The scalar Γ is a constant factor indicating the likelihood of a feature appearing anywhere in the image. The value of Γ is taken to be $1/N_{pixel}$ where $N_{pixel}$ is the number of pixels in the image. The class part k is restricted to satisfy the conditions <f, k>∈$M_{INIT}$ but k∉S(C) where C is the class of c. That is, k is the best matching part in terms of appearance that comes from a class different than c's class. If there is no such k, the value of $\tau_{pair}$ is used in place of $\max_k M_B(f, k)$.

The likelihood of a correspondence hypothesis is the product of the probabilities of all its feature-part matches. This is referred to as the "class likelihood ratio under a hypothesis". It is computed as $$L(h)=\Pi_i L(f_i, c_i, \Gamma(h)), \text{ where } <f_i, c_i>\in h\qquad(13)$$

This is the form of class score used by the first embodiment. Other embodiments may compute a class score in other ways.
Selecting an Initial Correspondence for Extension An initial correspondence hypothesis $h_0$ is retained only if $$L(h_0)\geq\tau_{init}(s)\qquad(14)$$

where s is the number of pairs in $h_0$.

If one or more class likelihood ratios are larger than the threshold $\tau_{init}(s)$, the correspondence hypothesis with the highest class likelihood ratio is selected for extension. After that hypothesis has been processed, as described below, this step is repeated with the remaining hypothesis having the highest class likelihood ratio. The process repeats until all initial hypotheses with acceptably high class likelihood ratios have been processed. Eventually, this process terminates when no class likelihood ratio is larger than the threshold $\tau_{init}(s)$.

Extending a Correspondence Hypotheses

Let $h_0$ be the initial correspondence hypothesis chosen for extension. The remaining unmatched image features (those not appearing in $h_0$) are tested to see if they can be added to the correspondence hypothesis. A working correspondence hypothesis, h, is initialized to $h_0$. Let C be the class of h. Let S(C) be the set of feature-part matches {<f, c>} defined by Equation (12).

Consider each of the pairs <f, c> in S(C) that is not already in h. Each of these pairs has an associated appearance likelihood of Type B. Each is tested, beginning with the pair with the largest appearance likelihood and proceeding in decreasing order, to see if its addition to h increases the class likelihood ratio. That is, a trial hypothesis ht is constructed as $h_t=[h, <f, c>]$ where <f, c> has the largest appearance likelihood of those pairs not yet tested. The aligning transformation is recomputed as $\Gamma(h_t)$. Then the class likelihood ratio under the hypothesis is computed using $h_t$ and $\Gamma(h_t)$ in Equation (13). If the class likelihood ratio is increased over its previous value, then the pair <f, c> is appended to h by setting $h=h_t$.

The process of adding new feature-part matches to the correspondence hypothesis process is repeated until no new feature-part matches are found that increase the class likelihood ratio under the hypothesis.

Testing for a Class Instance

When no new feature-part matches can be added to the working correspondence hypothesis, the class likelihood ratio is evaluated using Equation (13). This is compared to the threshold $\tau_C$ $$L(h)\geq\tau_C\qquad(15)$$

If the ratio does not exceed $\tau_C$, the hypothesis is taken to be invalid and discarded. If the class likelihood ratio does exceed $\tau_C$, the class C is declared present in the image. In this way, the first embodiment chooses a correspondence hypothesis whose class score meets an acceptance criterion. The final aligning transformation Γ(h) specifies the position and orientation of the class instance in the 3D scene. The class and aligning transformation are added to a set of identified class instances, which is an output of the recognition process.

Continuing the Search

There may be multiple class instances in the image. Hence, the processing continues. If a final correspondence hypothesis is accepted, all of its image features are removed from further consideration, since they have been accounted for. This entails the following steps: The image features are deleted from all other correspondence hypotheses. For each correspondence hypothesis so affected, a check is made to see if it still has at least $\tau_{minH}$ feature-part matches; if not, it is eliminated. If a correspondence hypothesis does have at least $\tau_{minH}$ pairs, a new aligning transformation is computed with the remaining pairs. The class likelihood ratio is recomputed under the new aligning transformation.

The search is continued: The remaining initial correspondence hypothesis with the highest class likelihood ratio is chosen. It is extended as described above, possibly leading to an identified class instance. This process continues until all initial correspondence hypotheses with a class likelihood ratio above the threshold $\tau_{init}(s)$ have been considered. The result is a set of identified class instances.

Computing Thresholds in the First Embodiment

The first embodiment uses several thresholds in recognition. These are computed when the 3D class database is constructed, but it is convenient to describe their construction here because their construction uses several equations defined in the recognition phase.

In many applications, it is desirable to validate a class database before it is used in production. One way of doing this validation is employ a test set of 3D scenes with known objects in known poses. This is referred to as the "ground truth". Images are acquired of the scenes, recognition performed, and the results compared to the ground truth. The comparison verifies correct operation and produces an empirical recognition rate. In the first embodiment, this validation process is modified and extended to compute the thresholds used in recognition.

A common method for creating obtaining ground truth is the "leave-one-out" method. This is described in texts such as Duda, Hart, and Stork, *Pattern Classification*, supra. The first embodiment uses a variation of this method. Several special versions of the class database are constructed. In each version, a small fraction of the views of each object are randomly chosen to be withheld from database construction. However, the detected features in these views are still matched to the neighboring views. By observing which class parts the matching features in the neighboring views participate in, it is possible to associate each object element in each withheld view with its correct class part label with very high accuracy. In the first embodiment, this is done, resulting in a set of withheld object elements, each of which is labeled with class and class part.

In addition, other scenes having no objects belonging to the classes to be recognized are processed and features detected. These features are used to model a background and are called "background features."

The first embodiment constructs a feature set F from a simulated scene containing class instances by performing the following steps:
(1) One or more classes from the database is chosen. Let n be the number of classes in the database. For each class i, a number $m_i$ is sampled from a geometric distribution with parameter p=1/n.
(2) For each class i, $m_i$ object instances from the class are chosen at random and uniformly.
(3) For each object instance, a withheld view is chosen at random and uniformly.
(4) For each view, features detected in that view are sampled by choosing each independently with probability q where q is a detection probability consistent with the repeatability of the feature detector.
(5) The number of background features, B, is sampled from a binomial distribution with parameters N and p. N is the total number of background features available and the value of p is chosen so that the mean, N*p, is equal to the mean number of background features detected in the image of a typical scene.
(6) Finally, B features are sampled uniformly and without replacement from the total set of background features available.

The result of this process is a synthesized feature set comprising a view of one or more object instances together with a set of background features.

The first embodiment repeats this process to construct a large set of synthesized feature sets for which the ground truth is known. Let G denote the resulting set of labeled data.

The thresholds to be computed are used in various tests in recognition. In general, there are two kinds of errors a test can make:
(1) The outcome of the test is true when it should be false (false positive).
(2) The outcome of a test is false when it should be true (false negative).

Let $\tau$ be a threshold to be chosen. Let F denote a set of features. Define FP(F, $\tau$) to be 1 if a test gives a false positive and zero otherwise; define FN(F, $\tau$) to be 1 if a test gives a false negative zero otherwise. Finally, let $\alpha \in [0,1]$ parameterize the tradeoff between committing false positive and false negative errors. With this, the overall penalty or cost of threshold $\tau$ on the feature set F is $$CF(F, \tau, \alpha) = \alpha FP(F, \tau) + (1-\alpha) FN(F, \tau)$$

This measures the weighted cost of errors, so a small value is desirable. The value of the parameter $\alpha$ depends on the particular test and the application. It is chosen by the designer. Specific choices are given below, but other values of $\alpha$ may be used to achieve particular constraints on accuracy, memory, or running time.

Given a set of n feature sets G={$F_1, F_2 \ldots F_n$} the average cost is $$CG(G, \tau, \alpha) = \Sigma_i CF(F_i, \tau, \alpha)/n$$

The optimal value of $\tau$ is denoted by $\tau^*$. It minimizes the cost $$\tau^* = \mathrm{argmin}_\tau CG(G, \tau, \alpha) = \mathrm{argmin}_\tau \Sigma_i CF(F_i, \tau, \alpha)/n \quad (16)$$

In general, $\tau$ is a vector of all the thresholds to be optimized. Various embodiments of the present invention may compute or approximate Equation (16) in various ways.

The first embodiment makes a computational approximation by computing the thresholds in sequential steps. At each step, a single threshold is optimized, by evaluating Equation (16) for the particular $\tau$ under consideration and a particular test. The thresholds are optimized in the order: $\tau_{pair}$, $\tau_{init}(s)$, $\tau_C$, then $\tau_{minH}$. Finally, $\tau_{maxH}$ is chosen, as described below.

The threshold $\tau_{pair}$ determines when to retain the match of an image feature with a class part. As described above, the correct matches are known for the training set. The first embodiment computes the optimal value of $\tau_{pair}$ by evaluating Equation (16) with $\alpha$=0.05. In this case, FP and FN evaluate matches of image features to class parts for different values of $\tau_{pair}$, using Equation (11). This optimization determines the value of $\tau_{pair}$. This value is then fixed and used in both subsequent steps of threshold optimization and in recognition.

A similar process is carried out to choose an optimal value of $\tau_{init}(s)$, as follows. The value of $\tau_{minH}$ is temporarily taken to be 3; $\tau_{maxH}$ is temporarily taken to be a large value limited by the time available for threshold optimization. For each feature set, those pairs for which the appearance likelihood exceeds $\tau_{pair}$ are formed into initial hypotheses, an alignment is computed, and the joint appearance and geometry likelihood ratio is computed. It is known which of the initial hypothesis vectors correspond to the correct matching of features to class parts. The first embodiment computes the optimal value of $\tau_{init}(s)$ by evaluating Equation (16) with $\alpha$=0.05. In this case, FP and FN are evaluated using Equation (14). The optimization is done separately for each length, s, of the initial correspondence hypothesis. This optimization determines the values of $\tau_{init}(s)$ for each value of s. These are then fixed and used in both subsequent steps of threshold optimization and in recognition.

A similar process is carried out to choose an optimal value of TC, the threshold used to accept or reject a final correspondence hypothesis. In this step, the recognition algorithm is run to the point where a decision as to the presence of a class instance in the image must be made. The first embodiment computes the optimal value of $\tau_C$ by evaluating Equation (16) with $\alpha$=0.5. In this case, FP and FN are evaluating the correctness of recognition using Equation (15). This optimization determines the value of $\tau_C$.

A similar process is carried out to choose an optimal value of $\tau_{minH}$, the minimum length of an initial correspondence hypothesis. In this step, the recognition algorithm is run to the point where a decision as to the presence of a class instance in the image must be made. The first embodiment computes the optimal value of $\tau_{minH}$ by evaluating Equation (16) with $\alpha$=0.5. In this case, FP and FN use Equation (15). This optimization determines the value of $\tau_{minH}$.

The final step is determining $\tau_{maxH}$. It is chosen to be the largest value that results in an acceptable recognition time using the other thresholds.

Second Embodiment

The present invention can be also used for object recognition. Indeed, the present invention can be used for mixed object recognition and class recognition. However, for the purpose of exposition, it is convenient to describe object recognition, with the explicit understanding that the mixed case can also be carried out.

In the present invention, object recognition is very similar to class recognition. Hence, it is expedient to discuss only the major issues.

Database Construction in the Second Embodiment

For object recognition, a 3D database model is of one particular object. Many objects are deformable with multiple geometric states, or have multiple appearance states, or have multiple ancillary states. For example, the face of a particular person undergoes deformation as the person's expression changes, the appearance changes if he grows or shaves a beard, and the appearance further changes with the presence or absence of eyeglasses.

The first step in constructing a 3D database model is to acquire sample views. For an object with multiple states, it is useful to create a sample object for each major state, where each sample is the same object to be recognized, but in a different state of deformation or appearance. These are referred to as "sample states." Each sample state is a variation of the object used for modeling its variability.

An object of this kind has the statistical properties of a visual class and an appropriate 3D database model is the same as a 3D class model. Hence, the phrase "object class model" is used to refer to the 3D database model of an object and the phrase "object class part" is used to refer to its parts. Each object class model represents the variability of the associated object. In particular, an object class part represents local variability. The ability to construct and use a 3D database model for an object that accommodates variation is one of the advantages of the present invention.

An object with no deformation and no appearance change is a special situation with minimal variation, as described in the alternative embodiments.

Various adjustments are made in computing an object class model. One adjustment is made to the computation of covariance. When location clusters are computed, it may be that there is only a single 3D location in a cluster. The mean geometry and mean appearances are each computed from the single value. The covariances are computed from characteristics of the sensor used to acquire the views.

Hence, in general, an object class model comprises a collection of object class parts, where each part comprises a part geometry and a part appearance. Each part appearance comprises two appearance descriptors, one of which is pose invariant (Type A) and the other of which is computed from only 2D information (Type B).

Recognition in the Second Embodiment

Object recognition uses the same procedure as class recognition. In summary, it operates as follows: Type B appearance descriptors are computed from the 2D intensity information. These are used to locate probable correspondences between 2D image features and 3D object class parts. From these, a set of initial correspondences is constructed. A correspondence hypothesis is used to compute an aligning transformation between its object class and a portion of the image. Using the aligning transformation, appearance comparisons are made using the Type A pose invariant feature descriptors, which provide a more accurate evaluation. Geometry and appearance are used together to evaluate the class likelihood under the correspondence hypothesis.

If the class likelihood exceeds a threshold, the object is recognized. In this way, the second embodiment chooses a correspondence hypothesis whose class score meets an acceptance criterion. Alternative embodiments may use alternative measures in place of the class likelihood. In general, some class score is used for this purpose.

The present invention brings multiple innovations to object recognition. One is the form of 3D database models, which accommodate variation of an object. Another is the use of two appearance descriptors: one of which can be computed from 2D image data alone and the other of which is pose invariant. Various other innovations follow from these.

Alternative Embodiments and Implementations

The invention has been described above with reference to certain embodiments and implementations. Various alternative embodiments and implementations are set forth below. It will be recognized that the following discussion is intended as illustrative rather than limiting.

There are many alternative embodiments of the present invention and, in particular, of various procedural steps. Which is preferable in a given situation may depend upon several factors, including the application. Various applications have varied properties of the relevant visual classes, varied criteria for recognition accuracy, varied requirements for computational speed, and varied constraints on the affordability of computing devices. These and other considerations dictate choice among alternatives.

Acquiring Range and Intensity Data

In the first embodiment, range and co-located image intensity information is acquired by a stereo system, as described above. In alternative embodiments, range and co-located image intensity information may be acquired in a variety of ways.

In some alternative embodiments, different stereo acquisition systems may be used. Structured light systems may also be used. In other alternative embodiments, the multiple images used for the stereo computation may be obtained by moving one or more cameras. This has the practical advantage that it increases the effective baseline to the distance of camera motion. For large objects, this may be the most effective way to acquire object models.

In still other alternative embodiments, range and image intensity may be acquired by different sensors and registered to provide co-located range and intensity. For example, range might be acquired by a laser range finder and image intensity by a camera.

The images may be made in any portion of the electromagnetic spectrum, such as infrared, the visible region, or ultraviolet. They may be obtained by other imaging modalities, e.g. ultrasound, MRI, or PET. Combinations of imaging modalities may be used.

Sample Objects

In the first embodiment, class models are constructed from views of sample objects obtained under controlled conditions. In alternative embodiments, the conditions may be less controlled. There may be other objects in the view or the relative pose of the sample object in the various views may not be known. In these cases, additional processing may be required to construct the object models.

In other alternative embodiments, sample objects may be obtained under more controlled conditions. Alternative embodiments may use a 3D CAD model and texture maps of its surfaces to synthesize the 3D appearance of an object. Techniques from computer graphics may be employed in so doing. Computer game hardware may be used to render synthesized views. Some embodiments may use the synthesized objects exclusively. Other embodiments may use a combination of synthesized and physically observed objects.

Class Recognition with Deformable Objects

The first embodiment is optimized for class recognition where the objects belonging to each class are rigid. As noted previously, many objects are deformable with multiple geometric states, or have multiple appearance states, or have multiple ancillary states. Alternative embodiments for class recognition may build class models where each object in each class may undergo changes to appearance or deformation. In such embodiments, samples are chosen to be representative of the anticipated changes. The ability to construct and use 3D class models that accommodates variation of objects in each class is a feature of the present invention.

Object Recognition with Rigid Objects

The second embodiment provides for object recognition where the objects may be deformable. Alternative embodiments may be constructed for object recognition in the special case in which objects are rigid. In this case, various adjustments are made in computing an object class model. One adjustment is made to the computation of covariance. If an object is rigid, it may be assumed that multiple observations provide independent observations of the same underlying appearance and location information. Thus, a location cluster consists of an average value over all observed instances of an object element. Let $\Lambda_{A,nom}$ be the nominal covariance of the Type A descriptor based on sensor and related characteristics. Consider a specific feature. Let n be the number of times it is observed in the several views of an object. Then the covariance $\Lambda_A$ for that feature is set to be $\Lambda_{A,nom}*(1/n)$. The covariance AB and the covariance $\Lambda_\Phi$ are computed in a similar way from nominal values $\Lambda_{A,nom}$ and $\Lambda_{\Phi,nom}$ based on sensor and related characteristics.

Interest Point Operators

In the first embodiment, a single interest point operator is used, as described above. In alternative embodiments, other interest point operators may be used. Some possible interest point operators are described in the section Detecting Interest Points, supra. In addition to these, other interest point operators may be advantageously used. For example, in certain applications, it may be desirable to design interest point operators specifically for detecting classes important in that application. Such customized interest point operators may be designed by machine learning techniques, manual supervision, or a combination of these.

In other embodiments, multiple interest point operators may be used and an interest point accepted if identified by any of the interest point operators. In other embodiments, multiple interest point operators may be used and an interest point accepted if multiple interest point operators each identify an interest point within a neighborhood.

Canonical Appearance

When models of sample objects are constructed in the first embodiment, the local image in the neighborhood of a 3D interest point is transformed to be frontal normal. Hence, in each element of a sample object, the element appearance is if the element were viewed along the local surface normal. This is one form of a "canonical appearance". In alternative embodiments, the local neighborhood may be transformed so it appears as if it were viewed along some other standard viewing direction, resulting in alternative forms for the canonical appearance of sample object elements. In any case, the canonical appearance of the sample object elements results in a canonical appearance of the class parts.

Reducing the Dimensionality of the Appearance Descriptors

The appearance of a local region is a high-dimensional quantity. In alternative embodiments, dimensionality reduction can be performed to reduce this to a more tractable representation. There is an extensive literature on dimensionality reduction and, in various applications, various techniques from this literature may be employed.

Appearance Descriptors

In the first embodiment, local appearance is represented as described above. In alternative embodiments, other representations of local appearance may be used for each of the Type A and Type B appearance descriptors. The section Representing Interest Points describes some possible representations. In addition to these, other appearance descriptors may be advantageously used.

A Type B appearance descriptor is computed from 2D image information without using range data.

A Type A appearance descriptor is computed using range data, so it can be made pose invariant. Various forms of pose invariant appearance descriptors can be used. One group if techniques for so doing is to put the relevant appearance patches into a canonical form, then apply one of the standard techniques for constructing appearance descriptors to the patch in canonical form.

Projecting Alternative Type A Appearance Descriptors

In the first embodiment, the Type A appearance descriptor is the local appearance resampled to be in canonical form. As noted above, alternative embodiments may use alternative Type A appearance descriptors. This may involve resampling appearance to another canonical form, or projecting the canonical form using a linear or nonlinear function, or combinations of both.

When alternative Type A appearance descriptors are used, various adjustments are made to the structure of a class part and to the process of projecting appearance under an aligning transformation during recognition. Several alternative techniques for so doing are described below.

Consider a given class part. Let A be the local appearance of the part, resampled to be in canonical form; this is computed as in the first embodiment using the resampling function W. Let $\Psi$ be a function that computes a further projection of the local appearance into another form. For example $\Psi$ may be a linear dimensional reduction of the input data or it may be some form of nonlinear enhancement. Let q* denote this new appearance, that is $q^* = \Psi(W(p, \gamma, \phi))$. Define $Z(p, \gamma, \phi) = \Psi(W(p, \gamma, \phi))$.

The class part stores $A^* = (\mu_{A^*}, \Lambda_{A^*})$ where $(\mu_{A^*}, \Lambda_{A^*})$ are statistical models of the result of applying Z to detected image patches during database construction. It also stores the grid of 3D points to be used in resampling an image patch during recognition. The Type A appearance descriptor is A*.

Recognition uses these Type A descriptors. Let $f = (u, p, b)$ be an image feature, where p is the image patch. The distribution of the resampled patch $Q^* = (\mu_{Q^*}, \Lambda_{Q^*})$ is computed as follows. The mean is given by $\mu_{Q^*} = Z(p, \mu_\Gamma, \mu_\Phi)$. Assuming the function Z is differentiable, $\Lambda_{Q^*}$ is computed using techniques similar to those described in the first embodiment. The method described in the section Projection of Appearance Under an Aligning Transformation is employed except that Z takes the place of W. Let $K^*_\Phi$ be the Jacobian of Z with respect to $\phi$ evaluated at $\mu_\Phi$ and let $K^*_\Gamma$ be the Jacobian of Z with respect to $\gamma$ evaluated at $\mu_\Gamma$. Then $$\Lambda_{Q^*} = K^*_\Phi \Lambda_\Phi K^{*T}_\Phi + K^*_\Gamma \Lambda_\Gamma K^{*T}_\Gamma$$

The distribution Q* is compared with the distribution A* to compute the appearance likelihood. That is the descriptors A* and Q* are used in place of A and Q in Equation (10).

In other alternative embodiments, the Jacobians $K^*_\Phi$ and $K^*_\Gamma$ may be advantageously computed by applying the chain rule to $\Psi(W(p, \gamma, \phi))$ thus allowing the previously computed Jacobians, $K_\Phi$ and $K_\Gamma$, of W to be used. If $\Psi$ is a linear function, it may be regarded as a matrix. In this case, the covariance $\Lambda_{Q^*}$ may be written as the product of three matrices $$\Lambda_{Q^*} = \Psi \Lambda_Q \Psi^T$$

where $\Lambda_Q$ is defined as in Equation (9).

In other alternative embodiments, it may be advantageous to define Z directly on the image intensities without introducing the resampling operator W.

In other alternative embodiments, the canonical appearance descriptor A may be combined with one or more projections A* to create a joint appearance descriptor.

Other alternative embodiments may project both the part appearance and the image intensities to a third representation. One such alternative stores the A descriptor described in the first embodiment, but projects both A and an image patch to a common representation. The same general technique use above is employed: the means are obtained by projecting means and the covariance matrices are computed using the appropriate Jacobians. From these, likelihoods are computed using Equation (1).

In some embodiments, it may useful to employ methods of sampling and representing the image that are not differentiable in their standard form. The spin image representation, which makes use of histograms, is one example. In these cases, it is often possible to modify the representation slightly to make it differentiable. In the case of spin image, kernel-weighted histograms using differentiable kernels may be used to achieve this end.

One of the advantages of the present invention is the ability to compute the projection under an aligning transformation of a wide variety of Type A appearance descriptors and compute the appearance likelihood of an image feature given a class part using these various Type A descriptors.

Affine Invariance

In the first embodiment, the Type B feature descriptor is computed using the spin image technique. In alternative embodiments, it may be useful to perform additional computations on the region surrounding detected image features to render them affine invariant. One method for creating such affine invariant regions is described in K. Mikolajczyk et al., "A Comparison of Affine Region Detectors," supra. The detected image regions are normalized using the eigenvalues of the first or second derivatives of the image intensities about the detected interest point. The normalization is performed by resampling the image region so that the above-mentioned eigenvalues become equal. As a result, the image region may be made to be approximately invariant to 3D rotation and scale. The resulting normalized image region may be used as the Type B descriptor.

Alternatively, the spin image technique may be applied to the affine invariant regions so as to enhance their invariance to rotation. This approach may be useful in applications where the dominant gradient orientation in regions is not stable under change of viewpoint.

In other alternative embodiments, it may be useful to take advantage of the fact that the normalization process described above may be used to compute an affine pose for the feature, as described in F. Rothganger et al., "3D Object Modeling and Recognition Using Local Affine-Invariant Image Descriptors and Multi-View Spatial Constraints," *International Journal of Computer Vision*, vol. 66, no. 3, pp. 231-259, 2006. In this case, the consistency of the affine feature pose may be incorporated into an affine geometry likelihood function. The affine geometry likelihood function may provide an alternative means of choosing which correspondence hypothesis to extend. Furthermore, such embodiments may relate the 3D pose of the object class part or class part to the affine feature pose. In this case, an initial, approximate model alignment may be computed from as few as two feature matches, thus reducing the minimum length of an initial correspondence hypothesis to 2. This initial alignment may also be used to initialize the 3D pose alignment method described in the first embodiment.

Canonical Geometry

In the first embodiment, the sample objects are scaled to have canonical geometry as described above. In alternative embodiments, canonical geometry can be obtained in other ways. For example, overall scale and an object centroid can be computed by constructing a convex hull over the locations of sample object elements.

Alternatively, each coordinate axis can be scaled independently, or an affine transformation of the data can be performed. There are many other possible operations to create canonical geometry that might be used.

Other alternative embodiments may model geometric normalization values such as the ratio between object sizes along different class model axes when constructing a class model. The distribution of these values can be computed during training, and the geometry likelihood adjusted to include a term relying on global geometry. This allows an embodiment to better differentiate classes based on aspect ratio or other similar geometric constructs.

Identifying Corresponding Elements

In the first embodiment, corresponding elements in a set of sample objects are identified by clustering on the canonical geometry location. In alternative embodiments, additional information may be considered and different identification techniques may be used.

For example, element appearance may be considered when identifying corresponding elements. This may be useful when corresponding elements vary in location. Variability in location may be due to object deformation, or within-class variation of location, or both.

Additionally, both location and orientation may be considered when identifying corresponding elements. The use of orientation may be helpful when this is more stable than location.

In other embodiments, corresponding elements may be identified by other algorithmic techniques. For example the EM algorithm may be used to identify the 3D locations of the elements of canonical object models.

In other embodiments, there may be additional manual intervention. For example, the identification of corresponding elements can be constructed, supervised, or verified by a human operator. In one embodiment of this approach, interest points are detected and elements computed as in the first embodiment and a human operator identifies corresponding elements using a suitable graphical user interface. Where the application requires class models constructed with explicitly verified accuracy, such an alternative may be appropriate.

Aligning Views

In the first embodiment, when views are acquired of sample object, each view has an associated view pose obtained manually. Using the view pose, object elements are transformed to a common coordinate system to form an object model and the object models are placed in canonical geometric form. Alternative embodiments may perform additional alignment steps to obtain canonical geometry. For example, when a class has sample objects that are significantly different, it may be difficult to accurately obtain consistent view poses across the all the sample objects, so that an alignment step is desirable or required.

An additional alignment step may be carried out as follows. After the step of clustering on 3D locations, there are a set of clusters, each of which has a cluster center. Using these cluster centers, each view is processed separately to compute a pose adjustment for that view that makes it best correspond with the relevant cluster centers. Let the elements of a view be at locations $x_1, \ldots x_n$. Suppose that location $x_i$ belongs to a cluster with center $c_i$. Define the location error $e_i$ as $e_i = x_i - c_i$ (If a location corresponds to no cluster, it is ignored in this process.) Suppose that for some view, L of the elements belong to some cluster. Let $J_{\Phi i}$ be the Jacobian matrix of the partial derivatives of location with respect to change in pose, evaluated at $c_i$. To first order, $J_{\Phi i} \Delta_\Phi = e_i$. There are L such equations. Let $J_\Phi$ be the result of stacking the L matrices $J_{\Phi i}$ and let e be the result of stacking the L vectors $e_i$. Each $e_i$ contributes 3 rows. The result is an overdetermined system of equations with 3L rows $$J_\Phi \Delta_\Phi = e$$

This may be solved in the least squares sense for $\Delta_\Phi$ by solving the linear system $$(J_\Phi^T J_\Phi)\Delta_\Phi = J_\Phi^T e$$

The pose change $\Delta_\Phi$ computed in this way is the one that minimizes the sum of square errors. For each element, a new 3D location is obtained by applying the pose change to each $x_i$, resulting in a new location $y_i$. The new locations $y_i$ are used in constructing the part geometry. These may be preferable to the $x_i$ in the sense that they have been adjusted, so far as possible, to the correct pose of each view.

Other alternative embodiments may use other techniques to minimize the error between element location and cluster center. For example, the L1 norm may be used. Other robust estimation techniques may alternatively be used.

Yet other alternative embodiments may choose to adjust all views simultaneously by optimizing an error that is a function of the difference between the location of a point as observed in two views. That is, let $x_{j,k}$ denote the location of the point $x_j$ in the kth view. If $x_j$ is also visible in the ith view, the error $$e_{i,j,k} = T(\gamma_i, x_{j,i}) - T(\gamma_k, x_{j,k})$$

can now be optimized over $\gamma_i$ and $\gamma_k$ using the method described above, provided one of the two is held fixed. More generally, stacking Jacobians for all pairs of views and all shared points between view pairs while fixing a single view allows the method described above to be employed to optimize all view parameters simultaneously.

Combining Sample Objects to Construct a Class Database

In the first embodiment, the database of class models is constructed by clustering the locations of elements of the sample objects. In alternative embodiments, other techniques may be used. For example, a class model may be built incrementally. The class model is initialized, e.g., to an exemplar object model in canonical form. Each remaining canonical object model is added to the class model by associating the canonical object elements with the matching class parts. In outline, this is similar to the recognition process with several differences: (1) Only a single class is considered; (2) the matching involves 3D elements against 3D class parts with a good initial estimate of pose; and (3) initially, there is no good empirical basis for computing part covariance, so an estimate is used.

Segment Classes

In the first embodiment, an object model is constructed as described above. When an object is composed of multiple rigid segments connected by joints, it is possible to construct more representative models. Alternative embodiments may do so as follows: Each rigid segment is viewed separately and modeled as a separate sample object. A class is constructed for each segment, resulting in a segment class. Recognition identifies segments separately in the image and computes an aligning transformation that specifies the position and orientation of the instance of each segment class in the scene.

3D Class Models with Structure

In the first embodiment, a class consists simply of a set of parts with no hierarchical structure. In other embodiments, a class may have geometric structure, so that a class is composed of units with a geometric relationship between the units. The geometric relationship may be rigid, or it may be represented by a joint. Joint type may include prismatic joints, rotation about a single axis, or rotation about multiple axes.

Alternative embodiments may also construct class models that share units. This may speed up database construction, since models for previously encountered units may be re-used when constructing a new class. It may also speed up recognition, since a shared unit is represented once in the database, rather than multiple times.

In the first embodiment, the database consists of a one-level collection of classes. In alternative embodiments, there may be structure where a class contains sub-classes. For example the class of bears might contain sub-classes for black bear, grizzly bear, and honey bear. In such embodiments, recognition may proceed by starting with the most general class structure and progressing to the most specific.

Part Appearance in Class Models

In the first embodiment, the part appearance has two components as described above. In alternative embodiments, the part appearance may have fewer, additional, or alternative components. The Type A descriptor may be omitted. Other appearance descriptors computed from a canonical appearance may be used as the Type A descriptor. Multiple such descriptors computed from a canonical appearance may be used. Multiple Type B descriptors may be used.

Class Parts without Part Geometry

Some alternative embodiments may have no geometric descriptor. In such cases, recognition is based on appearance. Even in this case, the availability of 3D geometry in database construction is useful. It allows the appearance of each sample object element to be placed in canonical form. Hence, the appearance of each class part can be computed in canonical form.

Computation of Appearance Probability

The mean and variance of the aligned class part appearance are given by Equations (8) and (9) as $$\mu_Q = W(p, \mu_\Gamma, \mu_\Phi)$$

$$\Lambda_Q = K_\Phi \Lambda_\Phi K_\Phi^T + K_\Gamma \Lambda_\Gamma K_\Gamma^T$$

In the first embodiment, the likelihood of a patch is computed by evaluating $$P(p|A, Q) = G(\mu_A - \mu_Q; 0, \Lambda_A + \Lambda_Q)$$

In this computation, the matrix $\Lambda_A + \Lambda_Q$ must be inverted. In general, this matrix has a large dimension, so computing the Gaussian distribution is computationally intensive.

Alternative embodiments may use the following alternative technique. They define the random variable s as $$s = (K_\Phi^T K_\Phi)^{-1} K_\Phi^T (a-q),$$

where $K_\Phi$ is the Jacobian of W with respect to the pose $\phi$. The variable s is Gaussian distributed with mean $\mu_s$ given by $$\mu_s = (K_\Phi^T K_\Phi)^{-1} K_\Phi^T (\mu_A - \mu_Q)$$

The mean $\mu_s$ is a vector of length 6. It can be regarded as the change in pose that best accounts, in the least squares sense, for the difference in appearance between $\mu_A$ and $\mu_Q$.

The covariance $\Lambda_s$ is given by $$\Lambda_s = (K_\Phi^T K_\Phi)^{-1} K_\Phi^T (\Lambda_A + \Lambda_Q) K_\Phi (K_\Phi^T K_\Phi)^{-T}$$

The computation of $\Lambda_s$ requires a matrix inversion, but only of small 6 by 6, matrices. The likelihood of a patch p is approximated by $$P(p|A, Q) = G(\mu_s; 0, \Lambda_s)$$

The dimension of $\Lambda_s$ is 6 by 6, so it can be efficiently inverted when evaluating this Gaussian.

Other embodiments may choose other projections that allow for a low-dimensional evaluation of the probability of an image patch given a class part.

Discriminative Parts in Class Models

In the first embodiment, all class parts are treated equally. In practice, some class parts are more specific in their discrimination than others. The discriminatory power of a class part may be computed a variety of ways, typically based on its appearance. For example, it may be computed by comparing each part appearance in the database with every other; a discriminatory part is one that is dissimilar to the appearance of all other parts. Alternatively, mutual information may be used to select a set of parts that are collectively selective. The measure of the discriminatory power of a class part may be used to impose a cut-off; all parts below a threshold are discarded from the model. Alternatively, in some embodiments, the discriminatory power of a class part may be used as a weighting factor.

In the first embodiment, all class parts computed from the sample objects are retained. In alternative embodiments, parts supported by only a small number of object model elements may be discarded. Retaining only those parts with large support may provide a useful class generalization. It may also speed up the recognition process by reducing the number of class parts.

Classes Models with Loosely-Coupled Appearance and Geometry

In the first embodiment, a class model is a collection of parts where each part has an appearance and geometry. In alternative embodiments, it is possible to construct and use class models in which appearance and geometry are only loosely coupled. Such models might be advantageously used when a local appearance appears many times in a class instance.

In one such alternative, a 3D class model comprises:
1) a geometry model consisting of a statistical description of the position and related characteristics of interest points of sample objects;
2) an appearance model consisting of a statistical description of the appearance at interest points of the sample objects; and
3) a model of the co-occurrence of geometry and appearance.

In constructing a class model, a Gaussian Mixture Model is computed for location, resulting in set of so-called "geometry clusters". A Gaussian Mixture Model is computed for appearance, resulting is a set of so-called "appearance clusters". The co-occurrence model couples the two. It is an estimate of the joint likelihood of a geometry cluster and an appearance cluster; it is computed from the statistics of the sample objects in the class. Collectively, these three play a role analogous to a class part of the first embodiment.

During recognition, possible matches are identified between image features and appearance clusters. The co-occurrence model is use to identify possible geometry clusters associated with the appearance clusters. The geometry clusters so identified are used to compute a possible aligning transformation. The aligning transformation is used to identify additional matches between image features and geometry clusters. The joint likelihood ratio is computed using the appearance likelihood, the geometry likelihood, and the co-occurrence model. In this way, class geometry and appearance are modeled separately, but connected during recognition in such an alternative embodiment.

Extending the Class Database

In the first embodiment, the class database is constructed from a set of sample objects and subsequently used in recognition. In alternative embodiments, it is possible to extend the class database with recognized class instances. Suppose a set of 2D image features F is recognized as an instance of class C. The correspondence hypothesis links each image feature in F to a class part in C. The aligning transformation and the pose of each part may be used to compute the 3D location and the canonical appearance of each image feature.

Hence, each image feature of F may be used to update the corresponding part appearance using standard statistical estimation techniques applied to the mean and covariance of the class part appearance and resampled image patch.

Part location may be updated by making use of the fact that the pose reconstruction method of Lu, Hager and Mjolsness, "Fast and Globally Convergence Pose Estimation from Video Images", supra, computes the best 3D feature location that is consistent with the class part. This 3D location can again be incorporated with the prior class part location using the mean and covariance of the computed 3D feature location and the prior class part location.

Part orientation can be updated by computing the best fitting 2D affine transformation relating the observed part appearance after resampling to the class part appearance model, extracting the three orientation components from the affine transformation and performing a statistical update of and part orientation.

Such updates may be done for all recognized class instances or only certain ones, e.g. cases in which the class recognition has a high degree of certainty. The updates may make use of additional information stored in the database such as the number of times a particular part was observed. They may make use of parametric or non-parametric statistical techniques for incorporating new information into an existing estimate.

The utility of updating the class database in this way depends on the application. Where it is essential that the database not be allowed to drift, it will be undesirable; where the database must adapt to changing situations, it may be very desirable.

Locally Frontally Aligning a 2D Image

In recognition, observations are acquired as 2D images. In the 3D scene, the surfaces are not in general frontally aligned, so they are not frontally aligned in the 2D image. In the first embodiment, no explicit correction is made for this. It is desirable to choose interest points and compute image features that are close to the ones that would have been chosen had each portion of the image been frontally aligned. In alternative embodiments, it is possible to partially to correct for this using various technique to frontally align the image in local regions.

One means for doing so is described by the following process. At each point in the 3D scene, there is some local slant and tilt of the local surface. If the slant and tilt at a point in the corresponding image were known, it could be compensated for by a local anisotropic scaling. In practice, the slant and tilt is unknown and varies from point to point. In one group of alternative embodiments, the entire image $I_0$ is transformed under J-1 different anisotropic scalings, resulting in J images, $I_0, I_1, \ldots, I_{J-1}$ each of which corrects for a particular slant and tilt. Suppose there are a large number of such scalings, chosen to provide uniform coverage of the possible slants and tilts. Then, for any point in the image, there is some image, say $I_k$, such that the slant and tilt of $I_k$ is very close to the actual slant and tilt at that of the visible object surface point. The choice of k varies from point to point.

In any particular embodiment of this technique, the number of scalings is chosen based on a trade-off. More scalings imply that each local slant and tilt is better approximated by one of the scalings. However, more scalings also imply that more interest points are detected. In many cases, a modest number of scalings may be used advantageously. In one embodiment, the anisotropic scalings are chosen such that for each point on each observable surface of each object in the 3D scene, there is some image that is within 20 degrees of a frontal normal view at that point.

Interest points are identified on the set of images $I_0, I_1, \ldots, I_{J-1}$. Features are computed at these interest points. Because the multiple images produced by anisotropic scalings are considered, a similar interest point will typically be detected and a feature computed on multiple images. Features in the multiple images can be conceptually grouped into sets whose members are corresponding features. In each set, the feature whose image slant and tilt is closest to the actual one will have the most accurate appearance descriptor relative to frontal normal viewing. Given a feature in one image, one can compute the set of corresponding features in other images, based on the location of their interest point in the original image, $I_O$ and the extent of the local regions. The set of features so computed is referred to as the "equivalent features".

In alternatives where this technique is used, various adjustments based on this equivalency are made in subsequent processing. For example, the image location of a feature is taken to be its location in the original image $I_O$. Also, note that the choice of image provides approximate tilt and scale. Observe that rotation can be computed from the local region of the interest point; scale can also be computed from the local region of the interest point if it is assumed that the instance and class have the same size (as they do in object recognition and may be an acceptable first order approximation in class recognition). Hence, an approximate pose of an image feature can be computed. Consequently, it possible to compute an aligning transformation using a single feature-part match. Also, when a feature is matched in recognition and removed from further consideration, all the equivalent features are removed. This technique is referred to as adjusting the image for viewpoint by "hypothesized anisotropic scaling".

Other embodiments may use other techniques for frontally aligning regions of an image. For example, in certain applications, flat surfaces may be identified by bounding straight edges. Under suitable circumstances, such flat surfaces may be frontally aligned using the geometry of the bounding edges.

Determining Plausible Matches of Image Features with Class Parts

In the first embodiment, recognition begins by finding pairs <f, c> where f is a feature in the image and c is a class such that the value of $M_B(f, c)$ is large. In alternative embodiments, it is possible to speed up the process of finding such pairs by using additional data structures. In such embodiments, each class part includes an additional so-called "qualitative descriptor" used as indices in these data structures. Various qualitative descriptors derived from the Type B appearance can be used for this purpose. Examples include following: the root mean square of gradients in each direction, the first K components of a principal component analysis, and a histogram of appearance values. Many others can be chosen. In general, the qualitative descriptor may have multiple components.

A qualitative descriptor is computed for each element of each sample object. From these, a qualitative descriptor is computed for each class part, as follows: For every component of the qualitative descriptor, the minimum and maximum values are computed over all corresponding object model elements. Thus, a component of the qualitative descriptor for a class part can be represented an interval bounded by the two extremal values. An index in the database is constructed from these intervals. In so doing, each component of the qualitative descriptor is processed separately. Various techniques may be used to minimize the amount of data storage by using explicit pointers and data sharing techniques to construct the indices.

During recognition, the qualitative descriptor is computed for each image feature appearance. If f is an image feature being considered in recognition, the qualitative descriptor is used to look up those class parts with qualitative descriptors that provide a plausible match. Suppose q is a qualitative descriptor. For each of the components of q, the lookup returns the set of class parts consistent with that component. Let $\lambda_i$ be the set of parts consistent with the ith component. The parts consistent with all the qualitative descriptors is the logical and over i of $\lambda_i$.

Other alternative embodiments might replace the intervals by other data structures to describe the set of possible values or the set of most common values. Various data structures might be used to do the lookup.

Filtering Pairs in Recognition

The first embodiment retains an feature-part match <f, c> based on the test $M_B(f, c) > \tau_{pair}$. Alternative embodiments may use other or additional filters to decide which pairs to retain. For example, the pair <f, c> can be regarded a good match if it is sufficiently distinctive. That is, the part is similar to the feature and no other part is similar to the feature. This distinctiveness may be measured by the ratio $$M_B(f, c)/\max_k M_B(f, k), k \neq c$$

This ratio may be computed and compared with a suitable threshold. Other embodiments may use other measures in choosing the pairs to retain.

Constructing a Set of Initial Correspondence Hypotheses

The first embodiment constructs a set of initial correspondence hypotheses as described above. Alternative embodiments may obtain initial correspondence hypotheses in other ways.

One alternative is to construct the set of initial correspondence hypotheses incrementally. For example all initial correspondence hypotheses with exactly $\tau_{minH}$ pairs could be considered first, then all with exactly $\tau_{minH+}1$, and so on. This process stops when either some maximum number of pairs is reached or when no class has enough pairs to construct an initial correspondence hypothesis.

Another alternative is to employ a different mechanism for choosing correspondences. Correspondences may be chosen at random or according to some probability distribution. Alternatively, a probability distribution could be constructed and the RANSAC method may be employed, sampling from possible feature correspondences. The RANSAC method is described in standard texts such as Forsyth and Ponce, *Computer Vision*, Prentice Hall, 2003.

In other alternatives, groups of correspondences [<$f_1$, $c_1$>, ..., <$f_n$, $c_n$>] may be chosen so that the image features $f_k$ are in a nearby region of the image, so as to improve the chance than all the $f_k$ are associated with the same object in the scene. Distance in the image may be used as a weighing function in some random sampling technique for choosing the image features $f_k$. Alternatively, features may be preferentially chosen in particular portions of the image that are of interest in a particular application. There are many variations on these techniques.

In the first embodiment, only appearance information is used to choose the initial correspondences. In alternative embodiments, location information may be used in this step. For example, class parts may be restricted to those where the variance in part location is small. This selectivity may increase the reliability of the initial alignment.

In the first embodiment, the minimum and maximum number of feature-part matches used to construct an initial correspondence hypothesis is determined for the entire database. In alternative embodiments, the number may be determined empirically for each class.

Choosing Which Correspondence Hypothesis to Extend

The first embodiment chooses the initial correspondence hypothesis to extend by computing an aligning transformation for each, computing the class ratio under the hypothesis, and choosing the one with the largest class ratio. Alternative embodiments may make the choice in other ways. For example, an initial correspondence hypothesis can be scored using the values $M_B(f, c)$ for all pairs <f, c> in the hypothesis. This is faster to compute and may be desirable in some applications.

Efficient Pose Computation While Extending Correspondence Hypotheses

When extending a correspondence hypothesis, it is not necessary to compute the aligning transformation ab initio. Rather, the prior estimate of an aligning transformation can be used as an initial guess. In the algorithm by Lu, Hager, and Mjolsness, "Fast and Globally Convergence Pose Estimation from Video Images", supra, this can be accomplished by beginning the pose optimization at the aligning transformation computed before extension.

Finding Good Correspondence Hypotheses

Recognition entails finding good correspondence hypotheses, which is a search problem. The first embodiment uses the search strategy described above and alternative embodiments may modify this search strategy as described above.

However, other embodiments may use entirely different search strategies. Two example of alternative search strategies are as follows:

(1) Observe that the process of choosing a correspondence hypothesis and extending it is a depth first search. It possible to instead use a breadth-first search in which multiple correspondence hypotheses are extended simultaneously. There are many variations on breadth-first search. In one variation, extensions are carried out so that on each round of extension all active correspondence hypotheses have the same length. In another variation, a merit function is used to determine which active correspondence hypotheses are to be extended on each round of extensions. In another variation, search starts with a large number of active correspondence hypotheses and the set is pruned as the search progresses. In another variation, the set is grown as the search progresses.

(2) Instead of instead of constructing initial correspondence and extending them, it is possible to construct complete correspondence hypotheses.

Geometry Matches Under an Aligning Transformation

In the first embodiment, the geometry likelihood under an aligning transformation is computed as described above. This projects the 3D location of each class part onto the image and computes that probability of observing the corresponding feature at its location given the projected location. In alternative embodiments, it may be desirable to compute the geometry likelihood in terms of 3D feature locations rather than 2D image locations.

One method for doing so is as follows. As described in Lu, Mjolsness and Hager, "Fast and Globally Convergence Pose Estimation from Video Images", supra, it is possible to describe an "object space error." To do so, observed 2D image locations u are expressed in 3D homogeneous coordinates v by appending the value 1 to the 2D image location value. Let the aligning transformation y consist of a rotation matrix $\Gamma$ and translation vector t as before. 3D feature locations are represented by the vector x. With this, the object space error is given by $$e = E(\gamma, x, v) = (1/\|v\|^2) v v^T (r x + t) - (r x + t)$$

For the correct value of y and corresponding x and v, it is the case that $E(\gamma, x, v) = 0$.

If $\gamma$, x, and v are Gaussian random variables, then to first order, e is a zero mean Gaussian random variable with variance $$\Lambda_e = J_\Gamma \Lambda_\Gamma J_\Gamma^T + J_X \Lambda_X J_X^T + J_v \Lambda_v J_v^T$$

where $J_\Gamma$ is the Jacobian of e with respect to $\gamma$ and $J_X$ is the Jacobian of e with respect to x. In typical applications, $\Lambda_v$ is inconsequential and so this term can be neglected.

Thus, given a class part with mean location $\mu_X$ and variance $\Lambda_X$, an estimated alignment $\mu_\Gamma$, with variance $\Lambda_\Gamma$ and an observed image location v, the approximation $$P(v|\mu_\Gamma, \Lambda_\Gamma, \mu_p, \Lambda_p) = G(E(\mu_\Gamma, \mu_X, v); 0, J_\Gamma \Lambda_{\Gamma\Lambda\Gamma} J_\Gamma^T + J_X \Lambda_X J_X^T)$$

may be used for the computation of the geometry likelihood of the element.

Appearance Matches Under an Aligning Transformation

In the first embodiment, the appearance likelihood under an aligning transformation computed as described above. This begins by taking the patch from a 2D image feature and resampling it to be aligned with the corresponding class part. Alternative embodiments may proceed in the other direction: That is, they may take the appearance of the class part and resample it to be aligned with the corresponding image feature.

In this case, the warping function W acts on the appearance model of a class part. It uses the class part pose and the aligning transformation to compute a change of coordinates from the camera frame to the pose of the feature in local coordinates. In one embodiment, it models the local image patch as planar, and computes a planar homography that can be used to project the class part appearance to the camera image under the aligning transformation. Let $p=W'(q,\gamma, \phi)$ denote the resampling of the class part appearance q with pose $\phi$ under the aligning transformation y.

The mean $\mu_p$ of the projected appearance is W' applied to the means of the distributions on q, $\gamma$, and $\phi$. The covariance of the class part appearance $\Lambda_p$ is computed using the Jacobian of W' with respect to q, $\gamma$, and $\phi$, and applying the transformation techniques described above. Let <f, c> be a feature-part match. Let the Type A appearance of feature f be $f_a$. Let the Type A appearance of c be q. Then an appearance likelihood of f given c under an aligning transformation $\Gamma$ may be computed as $$P(f_a|c, \Gamma)=G(f_a; \mu_p, \Lambda_p).$$

Finding Undetected Features

In the first embodiment, features are detected in the image and matched to class parts. In alternative embodiments, the processing of extending correspondence hypotheses may use the fact that an aligning transformation of a class model suggests the location of image features and, in particular, the location of possibly undetected image features. Two methods for using this are as follows.

In one alternative embodiment, once an aligning transformation has been computed for a correspondence hypothesis, the 3D locations of class parts are projected to the intensity image. For those class parts that should be visible but have no matching image features, the locations around the corresponding image regions are resampled using the warping function W and the Type A appearance descriptor is computed for warped image feature. This image appearance descriptor is compared to the Type A appearance descriptor for the part. If the incorporation of the resampled intensity increases the likelihood function for the correspondence hypothesis, the feature is used to extend the correspondence hypothesis.

In other alternative embodiments, the steps above may be augmented as follows. Once a class part is projected to the image, a larger region about the feature may be resampled using the warping function W. The interest point operator may be evaluated in the larger region to determine if an interest point exists and, if so, at what location and scale. If an interest point is detected, a feature is computed. The feature may be added to the list of detected features, the set of possible matches for that feature computed, and all relevant hypotheses updated with this feature. This process is repeated for all class parts that should be visible but have no matching image features. The computation then proceeds as before.

Computing Geometry Likelihoods

In the first embodiment, the probabilities related to a feature-part match are evaluated as independent Gaussian random variables. However, the process of fitting the pose of the class model using matches of image features to class parts reduces the number of degrees of freedom of the data and introduces dependence among the variables. Alternative embodiments may take advantage of this fact by instead evaluating the probability of the Mahalanobis distance between the detected feature location and that projected by the model. This distance will be distributed according to a chi-squared distribution. For n features, this distribution will have 2*n-6 degrees of freedom. Thus, the dependence of the data on the model fit will be appropriately accounted for.

Choosing a Pair to Extend a Working Correspondence Hypothesis

In the first embodiment, the trial pair to extend the working hypothesis is chosen as described above. In alternative embodiments, other choices may be made. For example, each suitable pair may be considered and the class likelihood computed with that pair taken as an extension. The pair that results in the highest class likelihood is chosen for extension.

Computing Class Likelihood Ratios

In the first embodiment, likelihood ratios are approximated by replacing a sum by a maximum, as described above. In alternative embodiments, these likelihood ratios may be approximated by considering additional terms. For example, rather than the single maximum, the K elements resulting in the highest probabilities may be used. K may be chosen to mediate between accuracy and computational speed.

Log Likelihoods and Log Likelihood Ratios

The first embodiment computes likelihoods and likelihood ratios. Alternative embodiments may instead use log likelihoods and log likelihood ratios to achieve equivalent ends. In the case of Gaussian distributions, the use of logs reduces most computations to the sums and differences of linear combinations of computed quantities. This avoids the need to evaluate the exponential function and improves the overall numerical stability of the method.

Discount Factor

In the first embodiment, the recognition of a class does not take into account the number of features that a class might have. For example, if 10 features are matched to a class with 10 visible parts, this is a much more likely match than 10 features matching in an object with 100 parts. This distinction is modeled using a third factor in the likelihood function, the discount factor $L_D$.

In the first embodiment, LD is taken to be 1. However, alternative embodiments may choose to use other discount factors. For example, alternative embodiments may choose $L_D(h, C, \gamma)=P(h|C, \gamma)$ which is the probability of the hypothesis h given a choice of class C and class aligning transformation $\gamma$. This model may be computed by determining the probability that a given class part of C is visible under the aligning transformation $\gamma$, then computing a binomial distribution on the number of feature matches using the total number of visible class parts and the probability of detecting and matching features.

Recognition When the Class Likelihood Ratio Does Not Exceed the Threshold

In the first embodiment, if the class likelihood ratio does not exceed the threshold, the match between a set of image feature and a class parts is disallowed as an initial match. In alternative embodiments, the initial match may be temporarily disallowed and other matches considered. If there are disallowed matches and a class instance is recognized subsequent to the match being disallowed, the match is reallowed and the recognition process repeated. This alternative embodiment may improve detection of class instances that are partially occluded. In particular, the computation of $P(h|C, \gamma)$ can take into account recognized class instances that may occlude C. This may increase the likelihood ratio for C after occluding objects are recognized.

In one alternative embodiment, the class discount factor is modified to take into account the probability of detecting a feature given the extent of the objects within the class. The extent of the objects can be represented as a 2D array of locations centered on the class center, where each array location stores the percentage of object views that occluded the given image location. Several such arrays can be stored to represent the probability of occlusion for differing class model poses. The probability of feature detection on undetected class instances is modified using the probability maps of class instances already detected, suitably resampled to account for location, scale and orientation.

Choosing Thresholds

The recognition phase uses several thresholds. The first embodiment chooses them as described above. Alternative embodiments may choose thresholds in other ways. Different values for the trade-off parameter α may be used. Non-linear trade-off functions may be used to compute the cost of error. Thresholds may be computed serially and then tuned by perturbation. Two or more thresholds may be computed jointly rather than serially.

In the first embodiment, the threshold $\tau_C$ on the class likelihood ratio for deciding that class instance has been identified is an empirically computed constant. In alternative embodiments, it may be obtained in other ways. In some alternatives, it may be determined empirically as a function of the length of the final correspondence hypothesis being evaluated. A technique similar to that described in the first embodiment may be used, with the optimization carried out separately for each length of final correspondence hypothesis. This may improve accuracy but requires a larger set of labeled data and takes longer.

In other alternatives, the threshold on the class likelihood ratio for acceptance may be determined for each class separately. In some applications, it may be desirable to make different choices for each class as to the relative cost of a false positive vs. a false negative. For example, suppose the database includes a class of dangerous objects that must not be overlooked (even at the cost of false alarms.) When the optimization is performed to determine thresholds, the cost of a false positive is reduced and the cost of a false negative is correspondingly increased for that particular class. In general, the thresholds on class likelihood ratios are computed to attain application-specific objectives. Hence they are referred to as "selected acceptance criteria".

Decision Criteria

The first embodiment computes probabilities and approximations to probabilities and bases the decision as to whether a class instance is present in an image using an approximation to the class likelihood ratio. That is, the first embodiment takes the so-called "class score" to be an approximation of the class likelihood ratio.

Other alternative embodiments may use a different definition of class score. For example, they may define the class score to be some function of the likelihood of the individual feature-part matches. Other alternative embodiments may define the class score to be the number of feature-part matches.

Still other bases for decision may be used. For example, a support vector machine may be used to learn the appearance of a class at a pose. The techniques described in the first embodiment may be used to construct hypotheses for class and pose, and then a support vector machine applied to the image, class and pose to decide whether a hypothesis is correct. Alternatively, other machine-learning techniques may be used to make the decision.

All of these are embodiments of the process of choosing correspondence hypotheses whose class scores meet an acceptance criterion.

Implementation of Procedural Steps

The procedural steps of several embodiments have been described above. These steps may be implemented in a variety of programming languages, such as C++, C, Java, Ada, Fortran, or any other general-purpose programming language. These implementations may be compiled into the machine language of a particular computer or they may be interpreted. They may also be implemented in the assembly language or the machine language of a particular computer.

The method may be implemented on a computer that executes program instructions stored on a computer-readable medium.

The procedural steps may also be implemented in specialized programmable processors. Examples of such specialized hardware include digital signal processors (DSPs), graphics processors (GPUs), cell processors, media processors, and streaming processors.

The procedural steps may also be implemented in electronic hardware designed for this task. In particular, integrated circuits may be used. Examples of integrated circuit technologies that may be used include Field Programmable Gate Arrays (FPGAs), gate arrays, standard cell, and full custom.

Implementation using any of the methods described in the present invention disclosure may carry out some of the procedural steps in parallel rather than serially.

Applications

Application to Robotics

Among other applications, the present invention may be applied to robotic manipulation. Objects may be recognized as described in the present invention. Once a class instance has been recognized, properties relevant to robotic manipulation can be looked up in a database. These properties include its weight, center of gravity, constraints on grasping forces that can be safely applied, and the like. Many of these properties are described by statistical distributions. Others, such as constraints on manipulation, may be common to all instances of the class.

Application to Face Recognition

Among other applications, the present invention may be applied to face recognition. Prior techniques for face recognition have used either appearance models or 3D models, or have combined their results only after separate recognition operations. By acquiring registered range intensity images, constructing models based on pose-invariant features, and using them for recognition as described above, face recognition may be performed advantageously. In such an application, 3D class models may be constructed based on sex, age, ethnicity, or distinctive facial features.

Face recognition can also be carried out as object recognition. In this case, an object is a specific individual. In particular, an individual who changes his appearance either deliberately or otherwise can be treated as an object with variability according to the present invention. The advantages of so doing will be apparent to one of ordinary skill in the art.

Other Applications

The invention is not limited to the applications listed above. The present invention can also be applied in many other fields such as inspection, assembly, and logistics. It will be recognized that this list is intended as illustrative rather than limiting and the invention can be utilized for varied purposes.

CONCLUSION, RAMIFICATIONS, AND SCOPE

The present invention provides a system and method for using 3D class models to recognize class instances in a 2D image and for using 3D object class models to recognize object instances in a 2D image.

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A computer-implemented method for recognizing class instances in a 2D image, comprising the steps of:
    (a) constructing a plurality of 3D class models, each model having one or more class parts, and storing the models in a database in a memory;
    (b) acquiring a 2D image; and
    (c) using a processor to match class instances appearing in the 2D image to the 3D class models, by identifying one or more image features in the 2D image and comparing the identified image features with one or more class parts belonging to the 3D class models.

2. The method of claim 1, where the step of constructing a plurality of 3D class models further comprises, for each class model, the steps of:
    (a) acquiring 3D images of sample objects belonging to the class;
    (b) constructing an object model for each sample object;
    (c) placing the object models in canonical geometric form; and
    (d) merging the object models in canonical geometric form.

3. The method of claim 2, where the step of constructing an object model further comprises the steps of identifying one or more interest points and computing a canonical appearance descriptor at each interest point.

4. The method of claim 2, where the step of merging the object models in canonical geometric form further comprises the steps of:
    (a) identifying sets of corresponding elements in the object models, each set comprising an element from one object model and one or more corresponding elements from other object models; and
    (b) constructing a class part for each set of corresponding elements.

5. The method of claim 4, where the step of constructing a class part further comprises the steps of:
    (a) computing a part geometry; and
    (b) computing a part appearance.

6. The method of claim 1, where the step of matching class instances appearing in the 2D image to the 3D class models further comprises the steps of:
    (a) identifying one or more image features in the 2D image, each feature having a feature location and a feature appearance;
    (b) constructing one or more correspondence hypotheses, each correspondence hypothesis comprising a class model and a set of feature-part matches;
    (c) using each correspondence hypothesis to compute an aligning transformation of the class model to the 2D image;
    (d) evaluating each correspondence hypothesis under the aligning transformation by computing a class score; and
    (e) choosing correspondence hypotheses whose class scores meet selected acceptance criteria.

7. The method of claim 6, where the step of constructing a correspondence hypothesis further comprises the steps of:
    (a) selecting an initial correspondence hypothesis;
    (b) identifying potential additional feature-part matches;
    (c) for each additional feature-part match, evaluating the class score for the correspondence hypothesis augmented by the feature part match;
    (d) extending the correspondence hypothesis with those feature part matches that increase the class score; and
    (e) repeating steps (b) through (d) above until no new feature-part matches are found that increase the class score.

8. The method of claim 7, where the step of selecting an initial correspondence hypothesis further comprises the steps of:
    (a) choosing a class model and a set of initial feature-part matches, each feature-part match comprising a feature appearance and a part appearance, and where the initial-feature part matches is chosen by comparing some component of the feature appearance with some component of the part appearance; and
    (b) forming a vector of the initial feature-part matches.

9. The method of claim 7, where the step of evaluating the class score for the correspondence hypothesis augmented by the feature-part match further comprises the steps of:
    (a) using the augmented correspondence hypothesis to compute an aligning transformation of the class model to the image;
    (b) comparing, under the aligning transformation, class parts with image features;

10. The method of claim 9, where the step of comparing, under the aligning transformation, class parts with image features further comprises the steps of:
    (a) computing a geometry comparison under the aligning transformation;
    (b) computing an appearance comparison under the aligning transformation; and
    (c) combining the results of the geometry comparison and the appearance comparison.

11. The method of claim 10, where the step of computing the geometry comparison under the aligning transformation further comprises the step of projecting the location component of the class part geometry to its equivalent 2D image location.

12. The method of claim 10, where the step of computing the geometry comparison under the aligning transformation further comprises the step of projecting the image feature location to its equivalent 3D model location.

13. The method of claim 10, where the step of computing the appearance comparison under the aligning transformation further comprises the step of projecting some component of the image feature appearance to its equivalent 3D model appearance.

14. The method of claim 10, where the step of computing the appearance comparison under the aligning transformation further comprises the step of projecting some component of the class part appearance to its equivalent 2D image appearance.

15. The method of claim 1, further comprising the step of frontally aligning the 2D image in local regions.

16. The method of claim 15, where the step of frontally aligning the 2D image in local regions is performed by hypothesizing one or more possible surface orientations and, for each surface orientation, computing the local image appearance as if the surface were at that orientation.

17. The method of claim 6, where the step of evaluating each correspondence hypothesis under the aligning transformation by computing a class score further comprises the step of comparing, under the aligning transformation, class parts with image features.

18. The method of claim 17, where the step of comparing, under the aligning transformation, class parts with image features further comprises the step of computing a geometry comparison under the aligning transformation.

19. The method of claim 17, where the step of comparing, under the aligning transformation, class parts with image features further comprises the step of computing an appearance comparison under the aligning transformation.

20. The method of claim 1, where the step of matching class instances appearing in the 2D image to the 3D class models further comprises the steps of:
    (a) computing an aligning transformation for each of one or more class models to the 2D image;
    (b) scoring the agreement of each said class model under its aligning transformation by computing a class score; and
    (c) choosing class models whose class scores meet selected acceptance criteria.

21. The method of claim 20, where the step of scoring the agreement of class models under the aligning transformations by computing a class score further comprises the step of comparing, under the aligning transformation, class parts with image features.

22. The method of claim 21, where the step of comparing, under the aligning transformation, class parts with image features further comprises the step of computing a geometry comparison under the aligning transformation.

23. The method of claim 21, where the step of comparing, under the aligning transformation, class parts with image features further comprises the step of computing an appearance comparison under the aligning transformation.

24. A non-transitory computer-readable memory containing a database of 3D class models, where:
    the computer-readable memory contains a database with a plurality of 3D class models, wherein:
    (a) each 3D class model comprises a plurality of class parts;
    (b) each class part comprises a part geometry and a part appearance; and
    (c) each part appearance comprises a first part appearance descriptor that is computed from 2D information.

25. The computer-readable memory of claim 24, where each part appearance further comprises a second part appearance descriptor that is pose invariant.

26. The computer-readable memory of claim 25, where:
    (a) each 3D class model represents a set of sample objects belonging to the class;
    (b) each sample object comprises a plurality of elements;
    (c) a plurality of the elements in each sample object have corresponding elements in another sample object;
    (d) each element comprises an element geometry and an element appearance;
    (e) each class part represents a set of corresponding elements in the sample objects;
    (f) the part geometry represents the set of element geometries of the corresponding elements; and
    (g) the part appearance represents the set of element appearances of the corresponding elements.

27. The computer-readable memory of claim 26, where the part geometry represents the canonical geometry of the corresponding elements.

28. The computer-readable memory of claim 26, where the second part appearance descriptor represents the canonical appearance of the corresponding elements.

29. A computer-implemented method for recognizing class instances in a 2D image, using a database of 3D class models, comprising the steps of
    (a) acquiring a 2D image;
    (b) identifying with a processor one or more image features in the 2D image, each feature having a feature location and a feature appearance;
    (c) constructing one or more correspondence hypotheses, each correspondence hypothesis comprising a class model and a set of feature-part matches;
    (d) using each correspondence hypothesis to compute with the processor an aligning transformation of the class model to the 2D image;
    (e) evaluating each correspondence hypothesis under the aligning transformation by computing a class score; and
    (f) choosing correspondence hypotheses whose class scores meet selected acceptance criteria.

30. The method of claim 29, where the step of constructing a correspondence hypothesis further comprises the steps of:
    (a) selecting an initial correspondence hypothesis;
    (b) identifying potential additional feature-part matches;
    (c) for each additional feature-part match, evaluating the class score for the correspondence hypothesis augmented by the feature part match;
    (d) extending the correspondence hypothesis with those feature part matches that increase the class score; and
    (e) repeating steps (b) through (d) above until no new feature-part matches are found that increase the class score.

31. The method of claim 29, where each class model in the database of 3D class models has class parts and the step of evaluating each correspondence hypothesis under the aligning transformation by computing a class score further comprises the step of comparing, under the aligning transformation, class parts with image features.

32. A system for recognizing class instances in a 2D image, comprising
    (a) a memory containing a database of 3D class models;
    (b) an image acquisition device for acquiring a 2D image;
    (c) a processor configured to match class instances appearing in the 2D image to the 3D class models, by identifying image features in the 2D image and comparing the image features with class parts belonging to the 3D class models.

33. The system of claim 32, where in the database of 3D class models:
    (a) each 3D class model comprises a plurality of class parts;
    (b) each class part comprises a part geometry and a part appearance; and
    (c) each part appearance comprises a first part appearance descriptor that is computed from 2D information and a second part appearance descriptor that is pose invariant.

34. The system of claim 32, where the processor is further configured to match class instances appearing in the 2D image to the 3D class models by:
    (a) computing an aligning transformation for each of one or more class models to the 2D image;

(b) scoring the agreement of each said class model under its aligning transformation by computing a class score; and
(c) choosing class models whose class scores meet selected acceptance criteria.

35. A non-transitory computer-readable medium having embodied thereon a program, the program being executable by a processor to perform a method comprising the steps of:
(a) constructing a database of 3D class models, each model having one or more class parts;
(b) acquiring a 2D image; and
(c) matching class instances appearing in the 2D image to the 3D class models, by identifying one or more image features in the 2D image and comparing the identified image features with one or more class parts of the 3D class models.

* * * * *